(12) United States Patent
Hiroi et al.

(10) Patent No.: US 10,546,173 B2
(45) Date of Patent: Jan. 28, 2020

(54) INFORMATION PROCESSING DEVICE, INFORMATION PROCESSING SYSTEM, POSITION REPORTING METHOD, AND PROGRAM RECORDING MEDIUM

(71) Applicant: NEC Corporation, Minato-ku, Tokyo (JP)

(72) Inventors: Noriyoshi Hiroi, Tokyo (JP); Yoshiaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 15/561,596

(22) PCT Filed: Apr. 11, 2016

(86) PCT No.: PCT/JP2016/062189
§ 371 (c)(1),
(2) Date: Sep. 26, 2017

(87) PCT Pub. No.: WO2016/163564
PCT Pub. Date: Oct. 13, 2016

(65) Prior Publication Data
US 2018/0068158 A1    Mar. 8, 2018

(30) Foreign Application Priority Data

Apr. 9, 2015 (JP) .................................. 2015-080163

(51) Int. Cl.
*G01C 21/00* (2006.01)
*G06K 9/00* (2006.01)
(Continued)

(52) U.S. Cl.
CPC ......... *G06K 9/00013* (2013.01); *G01C 21/04* (2013.01); *G06T 1/0007* (2013.01); *G06T 7/77* (2017.01)

(58) Field of Classification Search
None
See application file for complete search history.

(56) References Cited

U.S. PATENT DOCUMENTS 7,403,120 B2 * 7/2008 Duron ..................... G01S 13/75
340/572.1
8,401,781 B2 * 3/2013 Pazos .................. G01C 21/005
340/10.1
(Continued)

FOREIGN PATENT DOCUMENTS

JP       11-213126 A    8/1999
JP     2004-277095 A   10/2004
(Continued)

OTHER PUBLICATIONS

Hiroyuki Nakagawa et al., "The indoor movement of small robot for home use", Information Processing Society of Japan, National Convention Report (71), Mar. 10, 2009, vol. 3, Network, pp. 3-315 and 3-316 (total 2 pages).
(Continued)

*Primary Examiner* — Jonathan M Dager

(57) ABSTRACT

An acquisition unit acquires a photographed image data which is photographed by a user at a first position in a space. The photographed image includes at least any of the multiple markers. An identification unit identifies the first position, on which user have photographed an image, based on the markers included in the photographed image. An informing unit identifies second position relative to the first position identified by the identification unit, and informs the user of the second position relative to the first position.

8 Claims, 22 Drawing Sheets

(51) Int. Cl.
    *G06T 7/77*           (2017.01)
    *G01C 21/04*        (2006.01)
    *G06T 1/00*          (2006.01)

(56) References Cited

U.S. PATENT DOCUMENTS

| | | | | |
|---|---|---|---|---|
| 8,624,725 | B1* | 1/2014 | MacGregor | H04W 4/029 340/539.13 |
| 8,797,141 | B2* | 8/2014 | Best | G01S 1/68 340/572.1 |
| 8,818,706 | B1* | 8/2014 | Ogale | G01C 21/206 340/539.1 |
| 9,037,400 | B2* | 5/2015 | Tolstedt | A61H 3/061 701/411 |
| 9,140,554 | B2* | 9/2015 | Jerauld | G02B 27/017 |
| 9,462,423 | B1* | 10/2016 | Rivlin | H04W 4/043 |
| 9,758,305 | B2* | 9/2017 | Johnson | B65G 1/1378 |
| 10,146,302 | B2* | 12/2018 | Tokubo | G06F 3/012 |
| 10,176,718 | B1* | 1/2019 | Mazuir | G08G 1/123 |
| 2005/0099318 | A1* | 5/2005 | Gilfix | G09B 21/001 340/4.14 |
| 2006/0077172 | A1* | 4/2006 | Fukumoto | H04B 13/00 345/156 |
| 2006/0129308 | A1* | 6/2006 | Kates | A61H 3/061 701/532 |
| 2006/0144920 | A1* | 7/2006 | Fang | G06F 16/955 235/375 |
| 2006/0286972 | A1* | 12/2006 | Kates | H04M 1/05 455/415 |
| 2007/0069021 | A1* | 3/2007 | Elrod | G06K 17/00 235/451 |
| 2012/0143495 | A1* | 6/2012 | Dantu | G01C 21/206 701/428 |
| 2013/0041610 | A1* | 2/2013 | Waters | G01C 5/06 702/93 |
| 2013/0216093 | A1* | 8/2013 | Lee | A61H 3/061 382/103 |
| 2013/0297203 | A1* | 11/2013 | Kelly | G01C 21/18 701/454 |
| 2013/0337789 | A1* | 12/2013 | Johnson | H04W 64/00 455/414.1 |
| 2014/0184384 | A1* | 7/2014 | Zhu | G09B 21/003 340/4.12 |
| 2014/0278097 | A1* | 9/2014 | Khorsheed | G01C 21/34 701/533 |
| 2014/0343846 | A1* | 11/2014 | Goldman | G05D 1/0272 701/525 |
| 2015/0119086 | A1* | 4/2015 | Mirowski | G01S 5/0252 455/456.6 |
| 2015/0161424 | A1* | 6/2015 | Nevid | G06Q 30/0259 340/10.1 |
| 2015/0198447 | A1* | 7/2015 | Chen | G01S 5/0252 701/472 |
| 2015/0228124 | A1* | 8/2015 | Kim | G06F 3/04815 345/633 |
| 2015/0336274 | A1* | 11/2015 | Connell, II | G06F 16/51 700/259 |
| 2016/0005229 | A1* | 1/2016 | Lee | G06F 3/0488 345/419 |
| 2016/0148417 | A1* | 5/2016 | Kim | G05D 1/0044 345/419 |
| 2016/0284131 | A1* | 9/2016 | Koga | G06T 19/006 |
| 2016/0321530 | A1* | 11/2016 | Troy | G06F 3/1454 |
| 2017/0171719 | A1* | 6/2017 | Igarashi | H04W 4/043 |
| 2017/0337404 | A1* | 11/2017 | Rathus | G06K 7/10009 |
| 2018/0120106 | A1* | 5/2018 | Sato | G09B 29/004 |
| 2018/0288728 | A1* | 10/2018 | Berkovich | G01S 19/24 |
| 2018/0350093 | A1* | 12/2018 | Sweet | G01C 21/206 |
| 2019/0102626 | A1* | 4/2019 | Sakamoto | G06F 16/587 |
| 2019/0122174 | A1* | 4/2019 | Gil | H04W 4/029 |
| 2019/0149725 | A1* | 5/2019 | Adato | H04N 1/00 348/158 |
| 2019/0156577 | A1* | 5/2019 | Barros | G06T 19/006 |

FOREIGN PATENT DOCUMENTS

| | | |
|---|---|---|
| JP | 2006-111415 A | 4/2006 |
| JP | 2006-214832 A | 8/2006 |
| JP | 5247854 B2 | 7/2013 |
| JP | 5334145 B1 | 11/2013 |

OTHER PUBLICATIONS

International Search Report dated Jul. 5, 2016, issued by the International Searching Authority in application No. PCT/JP2016/062189.

Written Opinion dated Jul. 5, 2016, issued by the International Searching Authority in application No. PCT/JP2016/062189 [PCT/ISA/237].

* cited by examiner

Fig.2

| IDENTIFICATION INFORMATION | COORDINATES INFORMATION $(x, y, z, \alpha, \beta, \gamma)$ |
|---|---|
| 11111 | 0, 0, 0, 0, 0, 0 |
| 12345 | 40, 50, 60, 5, 0, −5 |
| 54321 | 90, 80, 70, 0, 0, 10 |
| ⋮ | ⋮ |

| No. | NAME | IDENTIFICATION INFORMATION | SHIFT AMOUNT (x, y, z, α, β, γ) |
|---|---|---|---|
| 1 | COMPONENT A | 11111 | 0, 0, 0, 0, 0, 0 |
| 2 | COMPONENT B | 12345 | 10, 10, 10, 0, 0, 0 |
| 3 | COMPONENT C | 54321 | 5, 5, 5, 0, 0, 0 |
| ⋮ | ⋮ | ⋮ | ⋮ |

| RANK | NAME | QUANTITY | FLAG | REMARKS |
|---|---|---|---|---|
| 1 | COMPONENT B | 1 | 1 (PICKED) | ········ |
| 2 | COMPONENT C | 10 | 0 (NOT PICKED) | ········ |
| 3 | COMPONENT A | 2 | 0 (NOT PICKED) | ········ |
| ⋮ | ⋮ | ⋮ | ⋮ | ⋮ |

Fig.12

| NAME | IDENTIFICATION INFORMATION | COORDINATES INFORMATION $(x, y, z, \alpha, \beta, \gamma)$ | NUMBER OF TIMES |
|---|---|---|---|
| COMPONENT A | 11111 | 0, 0, 0, 0, 0, 0 | 250 |
| COMPONENT B | 12345 | 40, 50, 60, 5, 0, −5 | 120 |
| COMPONENT C | 54321 | 90, 80, 70, 0, 0, 10 | 300 |
| ⋮ | ⋮ | ⋮ | ⋮ |

Fig.18
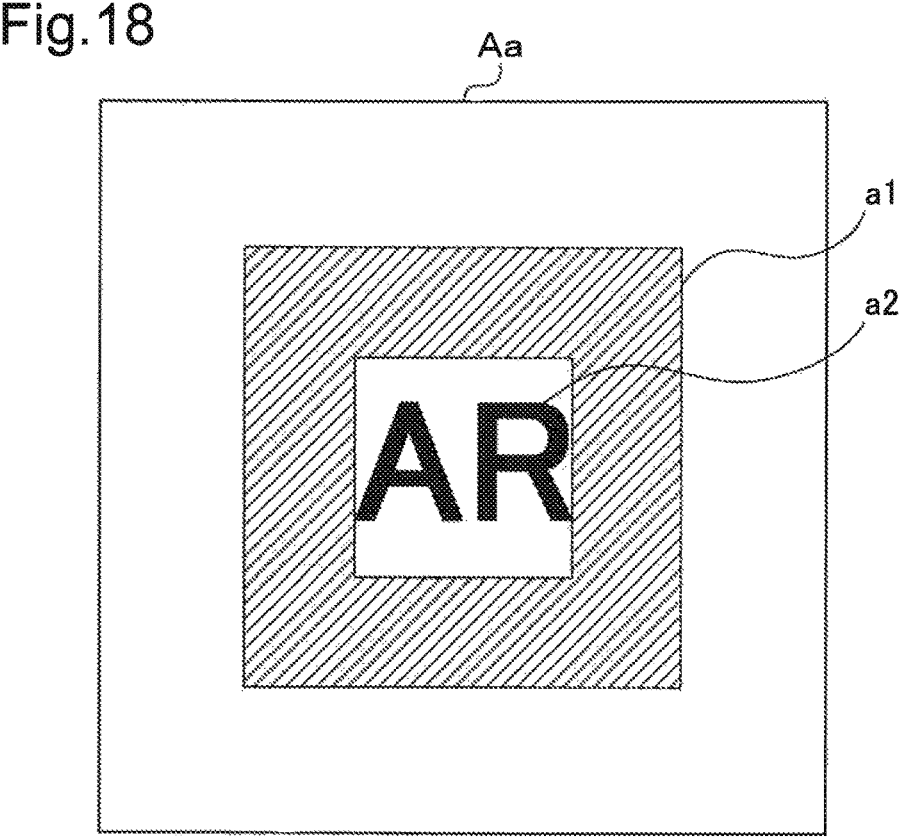
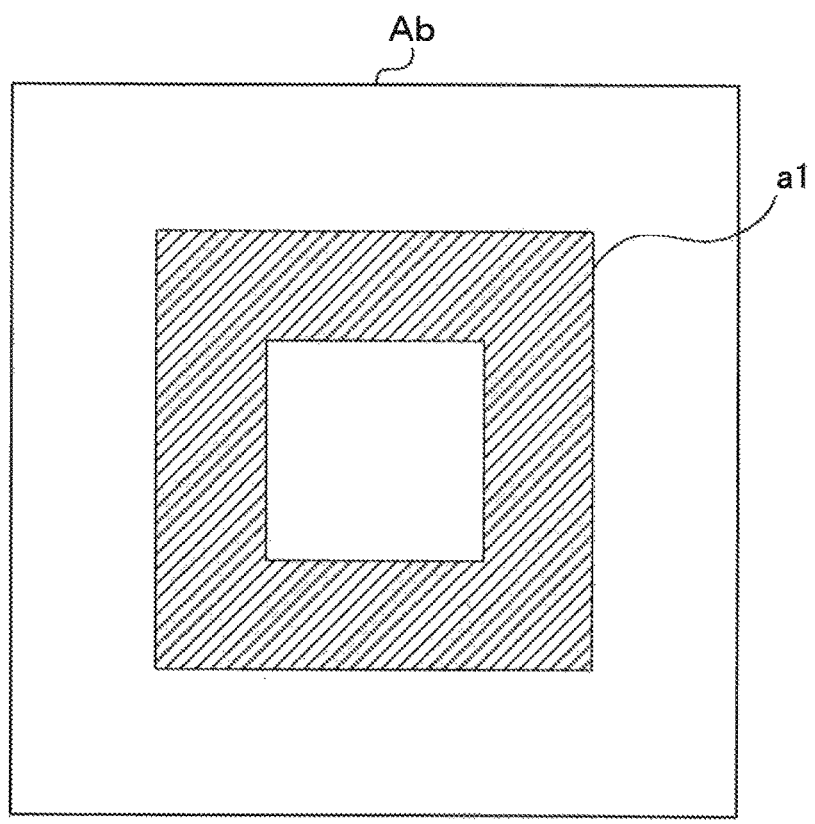

Fig.20

| NAME | IDENTIFICATION INFORMATION | COORDINATES INFORMATION (x, y, z, $\alpha$, $\beta$, $\gamma$) | NUMBER OF TIMES |
|---|---|---|---|
| | 00001 | 0, 0, 0, 0, 0, 0 | 250 |
| | | 40, 50, 60, 5, 0, −5 | 1 |
| | | 40, 80, 60, 0, 0, 10 | 1 |
| | 00002 | 0, 60, 0, 0, 0, 5 | 120 |
| ⋮ | ⋮ | ⋮ | ⋮ |

Fig.22

| NAME | IDENTIFICATION INFORMATION | COORDINATES INFORMATION (x, y, z, α, β, γ) | NUMBER OF TIMES |
|---|---|---|---|
| | 00001 | 0, 0, 0, 0, 0, 0 | 250 |
| COMPONENT B | 12345 | 0, 0, 0, 0, 0, 0 | 1 |
| COMPONENT C | 54321 | 0, 60, 0, 0, 0, 5 | 1 |
| | 00002 | 0, 60, 0, 0, 0, 5 | 120 |
| COMPONENT D | 67890 | 0, 60, 0, 0, 0, 5 | 1 |
| ⋮ | ⋮ | ⋮ | ⋮ |

Fig.23

| NAME | IDENTIFICATION INFORMATION | COORDINATES INFORMATION (x, y, z, $\alpha$, $\beta$, $\gamma$) | NUMBER OF TIMES |
|---|---|---|---|
|  | 00001 | 0, 0, 0, 0, 0, 0 | 250 |
| COMPONENT B | 12345 | 40, 50, 60, 5, 0, −5 | 1 |
| COMPONENT C | 54321 | 40, 80, 60, 0, 0, 10 | 1 |
|  | 00002 | 100, 0, 100, 5, 0, 0 | 120 |
| COMPONENT D | 67890 | 0, 60, 0, 0, 0, 5 | 1 |
| ⋮ | ⋮ | ⋮ | ⋮ |

Fig.24

| RANK | PAIR OF MARKERS | | NUMBER OF IDENTIFICATIONS | ADDITION FLAG |
|---|---|---|---|---|
| 1 | $A_3$ | $A_4$ | 1000 | 0 |
| 2 | $A_4$ | $A_5$ | 980 | 0 |
| 3 | $A_2$ | $A_3$ | 500 | 0 |
| 4 | $A_1$ | $A_2$ | 432 | 0 |
| 5 | $A_5$ | $A_6$ | 398 | 0 |
| 6 | $A_6$ | $A_7$ | 357 | 0 |
| 7 | $A_1$ | $A_7$ | 18 | 0 |
| 8 | $A_1$ | $A_3$ | 9 | 0 |
| 9 | $A_3$ | $A_x$ | 1 | 0 |

INFORMATION PROCESSING DEVICE, INFORMATION PROCESSING SYSTEM, POSITION REPORTING METHOD, AND PROGRAM RECORDING MEDIUM

This application is a National Stage Entry of PCT/JP2016/062189 filed on Apr. 11, 2016, which claims priority from Japanese Patent Application 2015-080163 filed on Apr. 9, 2015, the contents of all of which are incorporated herein by reference, in their entirety.

TECHNICAL FIELD

The present invention relates to a technique for informing a user of a position.

BACKGROUND ART

PTL 1 discloses a pickup system. The pickup system detects article identification information for identifying an article from a captured image. When the pickup system detects article identification information which matches the article identification information about the article of the pickup target article, it informs a pickup operator of positional information associated with the article identification information.

PTL 2 discloses a picking operation support device. The picking operation support device displays with an aisle, a rack, a frontage, and the like for an operator, sequentially emphasizing based on Augmented Reality (AR) markers or other optical feature information related to an article or article storage location.

PTL 3 discloses a layout drawing creation device which creates a layout drawing by taking an image of a barcode attached to every installed object.

CITATION LIST

Patent Literature

[PTL 1] Japanese Patent No. 5247854
[PTL 2] Japanese Patent No. 5334145
[PTL 3] Japanese Patent Application Publication No. 1999-213126

SUMMARY OF INVENTION

Technical Problem

According to the techniques disclosed in PTL 1 and PTL 2, the positional relation between the user and the position to informed of the user in a certain space (a workplace, for example) is unknown. Therefore, according to the techniques disclosed in PTL 1 and PTL 2, to inform a user of a desired position, the position must be captured, that is, the position must be included in an imaging range.

An object of the present invention is to inform a user of a target position, based on a positional relation to a position at which an image is captured in a certain space.

Solution to Problem

An aspect of the invention is an information processing device. The information processing device includes first acquisition means that acquires map data representing positions of a plurality of markers disposed in a certain space; second acquisition means that acquires image data representing a captured image which is taken at a first position in the space and which includes at least one of the plurality of markers; third acquisition means that acquires data of an informing target associated with a second position in the space; identification means that identifies the first position, based on the map data and on a marker included in the captured image; and informing means that informs a user of the second position, based on a relation to the first position identified by the identification means. The second position is a target to be informed.

An aspect of the invention is a position informing method. The position informing method includes acquiring map data representing positions of a plurality of markers disposed in a certain space; acquiring image data representing a captured image which is taken at a first position in the space and which includes at least one of the plurality of markers; acquiring data of an informing-target associated with a second position in the space, identifying the first position, based on the map data and on a marker included in the captured image; and informing a user of the second position to a user, based on a relation to the identified first position. The second position is a target to be informed.

An aspect of the invention is a program recording medium. The program recording medium records a program for causing a computer to execute the steps of: acquiring map data representing positions of a plurality of markers disposed in a certain space; acquiring image data representing a captured image which is taken at a first position in the space and which includes at least one of the plurality of markers; acquiring data of an informing target associated with a second position in the space; identifying the first position, based on the map data and on a marker included in the captured image; and informing a user of the second position, based on a relation to the identified first position. The second position is a target to be informed.

Advantageous Effects of Invention

According to the present invention, a informing-target position can be informed to the user, based on its positional relation to the position at which an image is captured in a certain space.

BRIEF DESCRIPTION OF DRAWINGS

FIG. 2 shows an example of map data.
FIG. 12 shows an example of map data.

FIG. 18 illustrates examples of markers Aa and Ab.

FIG. 20 shows an example of map data.

FIG. 22 shows an example of map data.

FIG. 23 shows an example of map data.

FIG. 24 shows an example descending order list.

DESCRIPTION OF EMBODIMENTS

First Example Embodiment

Figure 1:
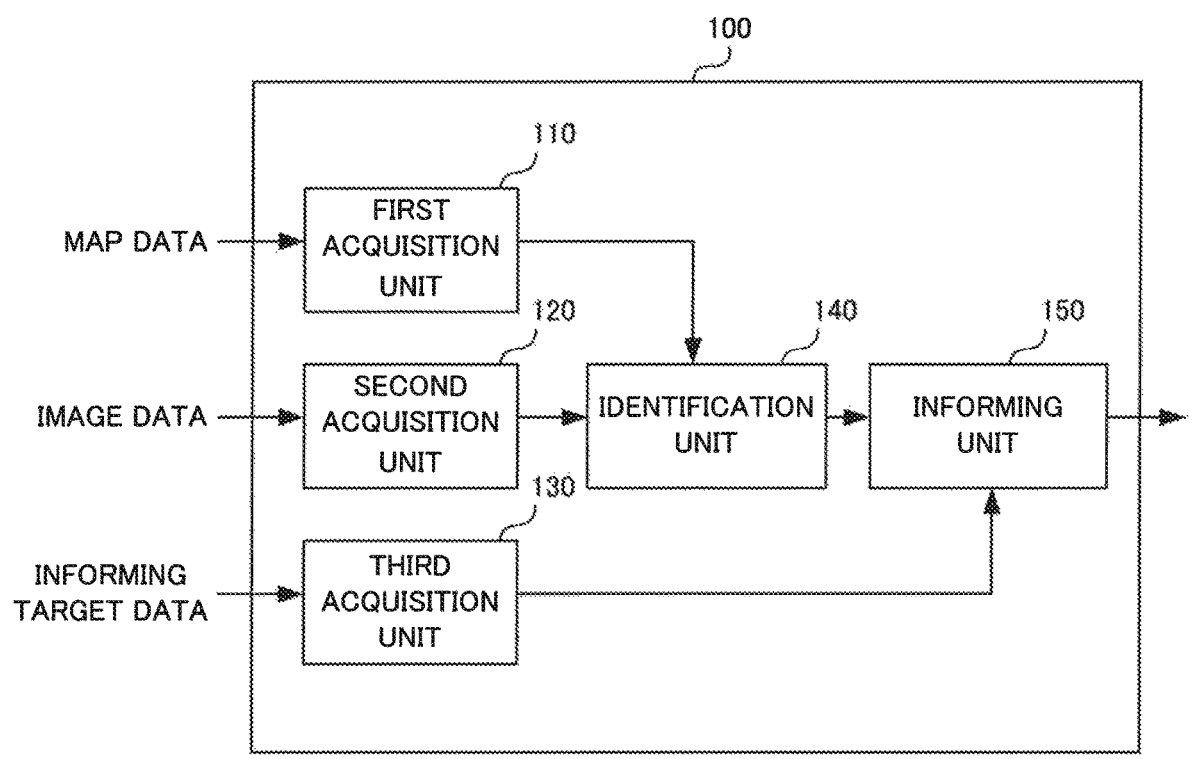
FIG. 1 is a block diagram illustrating a configuration of an information processing device 100.

FIG. 1 is a block diagram illustrating a configuration of an information processing device 100 according to one example embodiment of the present invention. The information processing device 100 is a computer device that includes a first acquisition unit 110, a second acquisition unit 120, a third acquisition unit 130, an identification unit 140, and an informing unit 150. The first acquisition unit 110, the second acquisition unit 120, the third acquisition unit 130, the identification unit 140, and the informing unit 150 are implemented through execution of a predetermined program by an arithmetic processing unit like a central processing unit (CPU). To the information processing device 100, an imaging means, a storage means, an input means, and an output means, which are described below, are connected.

The information processing device 100 is a computer device for informing the user of a position in a certain space. The space, as mentioned here, refers to a workplace such as a factory or warehouse. Positions including, for example, the position where an article (such as a component, material, ingredient, or commodity) or a marker is placed, are informed to the user.

Markers according to the present example embodiment each serve as a mark for a position in a space, and a plurality of markers are disposed in a predetermined space. These markers are disposed at different positions. No specific limitation is imposed on where the individual markers are placed, but the markers are preferably placed at such positions as allow the imaging means to capture images of the markers easily.

In addition, every marker is of a predetermined size and shape. An identification information for identifying the marker is recorded in the marker. The size and shape, as mentioned here, may refer to the size and shape (contour) of an object displayed with the marker, or may refer to the size and shape of a letter or graphic displayed as a marker on the object. For example, the marker according to the present example embodiment may be a display medium of a predetermined size and shape (a paper board, for example) on which the identification information is recorded, or may be a display medium of an indefinite shape on which a marker of a predetermined size and shape is printed or otherwise displayed. It is assumed here that the identification information is a number having a predetermined number of digits.

For example, a marker used for marker-based AR, as it is called AR marker, can be used as the marker according to the present example embodiment. By using an AR marker as the marker, a homogeneous transformation matrix expressing the position and attitude of a marker can be easily obtained from a captured image. Alternatively, a QR Code® or a barcode can be used as the marker according to the present example embodiment.

The first acquisition unit 110 acquires map data. The map data, as mentioned here, refers to the information that three-dimensionally represents a position in a certain space. More specifically, the map data represents a position in a space with positional information (that is, coordinates) and identification information regarding a marker. Coordinates of a marker may be described, for example, in a three-dimensional orthogonal coordinate system based on a predetermined position serving as the origin. The first acquisition unit 110 acquires map data from a storage means such as a hard disk.

FIG. 2 shows an example of the map data according to the present example embodiment. The map data according to the present example embodiment includes at least identification information and coordinates information regarding a marker. The coordinates information, as mentioned here, refers to data representing the position and attitude of a marker. The position of a marker is expressed with x, y, and z elements in a three-dimensional orthogonal coordinate system. The attitude of a marker (angle or inclination of a disposed marker) is expressed with Euler angles ($\alpha$, $\beta$, $\gamma$). Note that the coordinates information appearing in FIG. 2 (and the following figures) is described for convenience of explanation only, and does not necessarily reflect the actual positional relation among markers.

In the map data shown in FIG. 2, the position of the marker having the identification information "11111" is used as the origin of a coordinate system. However, the origin of a coordinate system for map data is not limited to a particular marker position but may be any suitable position in the space. For example, when the space can be considered to be substantially rectangular-cuboid, a vertex or the center of gravity of the cuboid may be used as the origin of a coordinate system.

The second acquisition unit 120 acquires image data. The image data acquired by the second acquisition unit 120 represents a captured image taken by the imaging means at a predetermined position. It is assumed that the captured image includes, in its imaging range, at least one of the markers disposed in a space. The imaging means is attached to, or carried with, the user, and thus moves along with the user. Hence, the position of the imaging means, or the imaging position, can be regarded as the position of the user. The imaging position corresponds to a "first position" in the present invention.

The third acquisition unit 130 acquires data of an informing-target. The data of the informing-target is associated with a position to be informed. The data of the informing-target need not represent the position itself, as long as a position can be identified from the data. For example, the data of the informing-target may be identification information regarding a marker. With such identification information regarding a marker, the position of the marker can be identified from map data. A position associated with the data of the informing-target corresponds to a "second position" in the present invention. For convenience of explanation, this position may be hereinafter called a "target position".

The identification unit 140 identifies the imaging position. First, based on the map data acquired by the first acquisition unit 110 and the image data acquired by the second acquisition unit 120, the identification unit 140 identifies the imaging position corresponding to the image data. Specifically, the identification unit 140 recognizes a marker in the captured image represented by the image data, and identifies the positional relation between the marker and the imaging position. The identification unit 140 can identify the positional relation, such as the distance between the imaging position and the marker or the marker's inclination, by comparing the size and shape of the imaged marker with the actual size and shape (that is, a predetermined size and shape). Next, based on the positional relation between the imaged marker and the imaging position and on the coordinates information regarding the imaging position as recorded in the map data, the identification unit 140 identifies the imaging position in a predetermined space, in other words, the imaging position expressed with coordinates in a coordinate system in which the map data is described. The identification unit 140 identifies a marker in a captured image, which in turn enables the identification unit 140 to identify the identification information regarding the marker. In other words, the identification unit 140 also serves as a means for identifying, in a captured image, a marker and its identification information.

If a captured image includes a plurality of markers, the identification unit 140 may identify the imaging position by using the marker closest to the imaging position, or by taking an average of coordinates determined by using all the markers. Alternatively, the identification unit 140 may assign weights to coordinates that are determined from all the markers, where the weights depend on the distance from the imaging position or the number of times of imaging, and then calculate an average or median value.

The informing unit 150 informs the user of the target position. More specifically, the informing unit 150 informs the user of the position associated with the data acquired by the third acquisition unit 130. By using the imaging position as identified by the identification unit 140, the informing unit 150 informs the target position based on its relation to the imaging position. For example, the informing unit 150 informs the user of the target position in such a way as seen from the imaging position.

For example, the informing unit 150 informs the user of the target position by emitting a light in the form of a beam from (or around) the imaging position. In this case, the informing unit 150 emits the light toward the desired position by controlling a light illuminating device that can change the direction of light radiation. Alternatively, the informing unit 150 may display a map indicating a route from the imaging position to the target position by controlling a display device.

Note that the informing unit 150 need only be a means for performing the process of informing the user of a position, and thus it may not necessarily include a means (for example, a light illuminating device or a display device) for presenting information to the user. In other words, the informing unit 150 may be a means for supplying the data for controlling operations of a light illuminating device or display device to such device.

Figure 3:
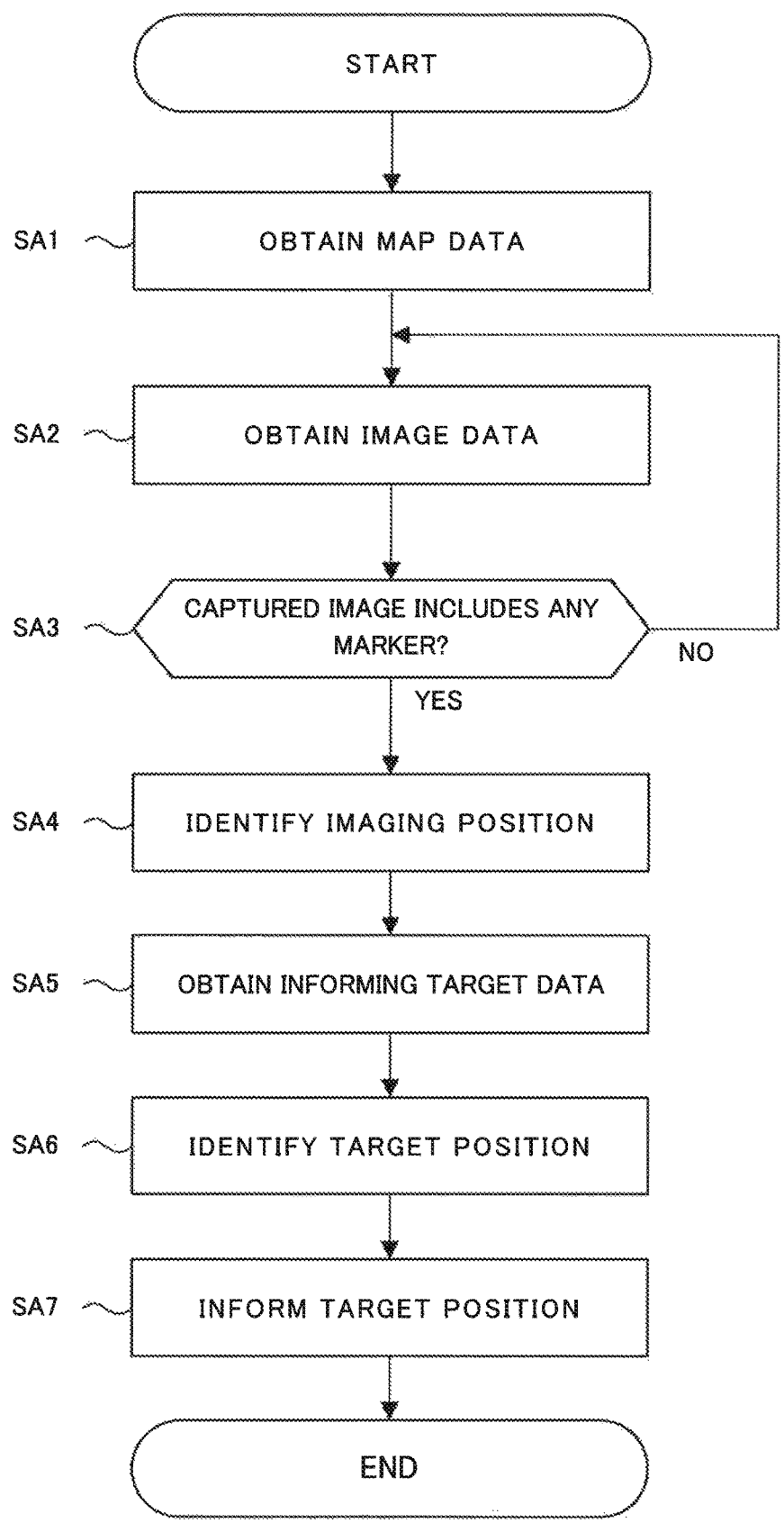
FIG. 3 is a flowchart illustrating processes carried out by the information processing device 100.

FIG. 3 is a flowchart illustrating processes carried out by the information processing device 100. A major feature of the processes is that the imaging position (that is, the user position) is identified based on map data, and the target position is informed for the user based on the relation between the imaging position and the target position.

In step SA1, the first acquisition unit 110 obtains map data. In step SA2, the second acquisition unit 120 obtains image data. Next, in step SA3, the second acquisition unit 120 determines whether the captured image represented by the image data includes any marker.

If no marker is recognized in the captured image (NO in SA3), the second acquisition unit 120 obtains image data again (step SA2). The second acquisition unit 120 repeats obtaining image data until any marker is recognized. During these operations, the information processing device 100 may display a message prompting the user to change the position or direction of imaging performed by the imaging means.

If any marker is included in the captured image (YES in SA3), the identification unit 140 identifies the imaging position in step SA4. The identification unit 140 identifies the imaging position by using the map data obtained in step SA1 and the image data obtained in step SA2.

In step SA5, the third acquisition unit 130 obtains data of the informing-target. In step SA6, the informing unit 150 identifies the target position based on the imaging position identified in step SA4 and the data of the informing-target obtained in step SA5. The informing unit 150 identifies this target position based on the relation between the imaging position and the target position. For example, the informing unit 150 identifies the direction toward the target position as seen from the imaging position. In step SA7, the informing unit 150 informs the user of the target position.

Note that the information processing device 100 may obtain map data, image data, and data of the informing-target in any order other than that illustrated in FIG. 3. For example, the information processing device 100 may start obtaining map data or image data, triggered by acquisition of the data of the informing-target.

According to the present example embodiment, the identification unit 140 identifies the imaging position, and consequently, based on the positional relation between the target position and the imaging position, the user can be informed of the target position. According to the present example embodiment, an imaging position is identified from a captured image, whereas a target position is identified from map data, and consequently, the user can be informed of the target position even when the target position is not included in the captured image.

Second Example Embodiment

Figure 4:
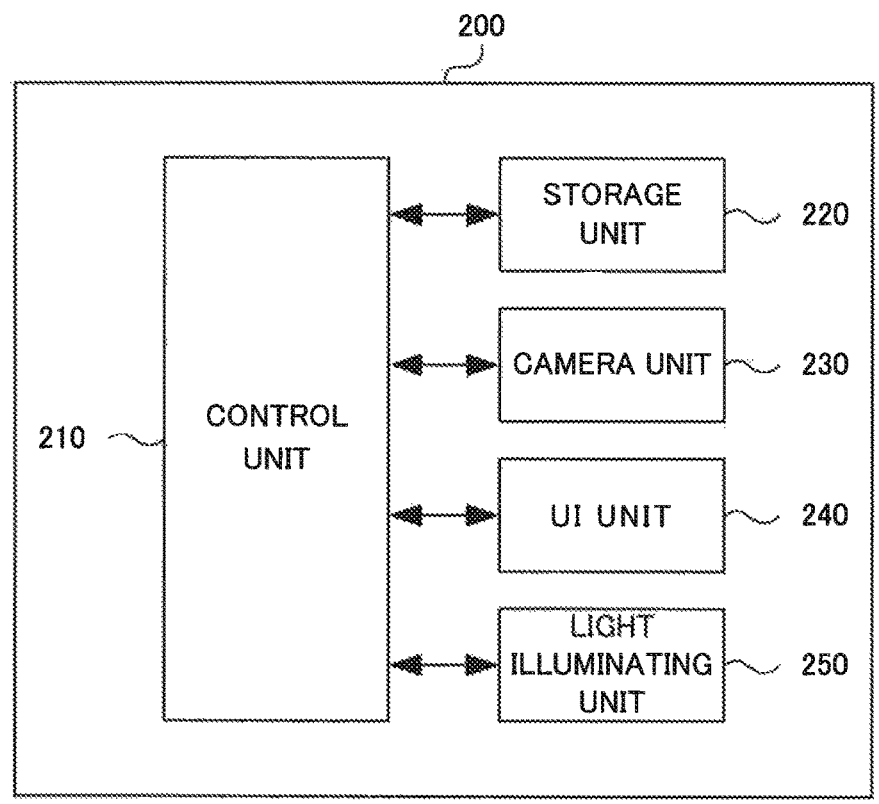
FIG. 4 is a block diagram illustrating a hardware configuration of a picking support device 200.

FIG. 4 is a block diagram illustrating a hardware configuration of a picking support device 200 according to another example embodiment of the present invention. The picking support device 200, which is an example of the above-described information processing device 100, is an information processing device intended to support picking operations and teaching operations performed by the user (operator). The picking support device 200 includes a control unit 210, a storage unit 220, a camera unit 230, a user interface (UI) unit 240, and a light illuminating unit 250.

The picking operation, as mentioned here, refers to finding and picking a target article from a plurality of articles (such as components, materials, ingredients, or commodities) in a factory, warehouse, or any other workplace. Every article is uniquely associated with its own particular marker. Every marker is affixed or otherwise disposed at a specific position (for example, near its corresponding article). The picking support device 200 is mounted on, for example, a cart to be used by the user for picking and carrying articles in the workplace, and thus moves along with the user. The picking support device 200 supports the user in performing picking operations, by informing the position of the article to be picked by the user.

The teaching operations are intended to make the picking support device 200 learn positions of markers. Teaching operations can also be seen as giving the picking support device 200 information for generating map data. For example, the user moves the cart on which the picking support device 200 is mounted, and causes the picking support device 200 to take images of markers disposed in a space.

Figure 5:
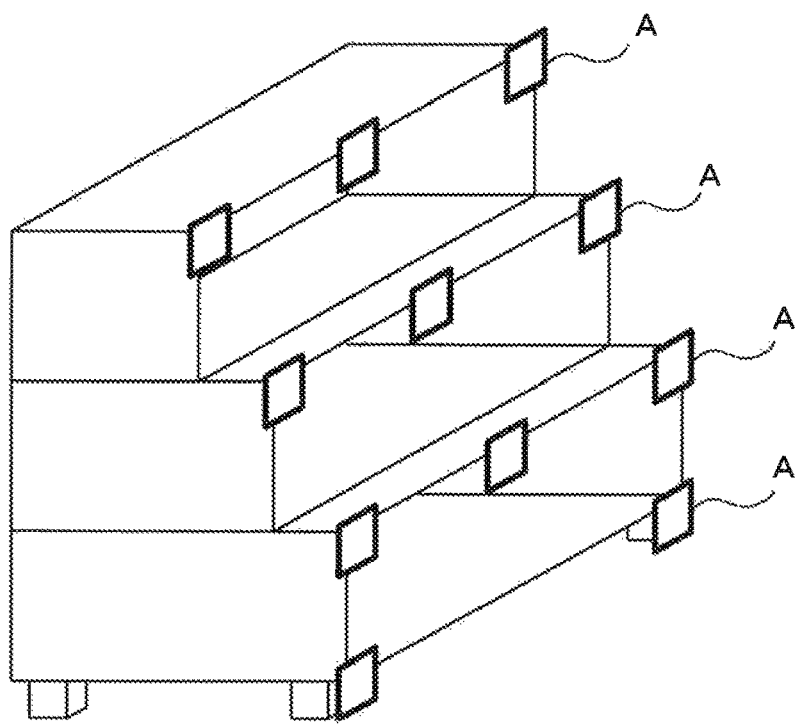
FIG. 5 illustrates an example of the state where markers are disposed on shelves.

FIG. 5 illustrates an example of the state where markers are disposed on shelves. In the present example embodiment, each individual article is stored in a predetermined place (section) on a shelf. Each article may be stored in a container, drawer, box, or the like, at a position visible or invisible from the user. A marker A is disposed in association with a place where an article is stored. Although the marker A is affixed on a shelf in this example, it may be affixed on a container or the like in which an article is stored, or may be affixed on a wall, not on a shelf. In addition, no specific limitation is imposed on the number or arrangement of markers A or of shelves. Furthermore, each shelf may have different faces through which the user puts an article and takes out the article.

Figures 6, 7:
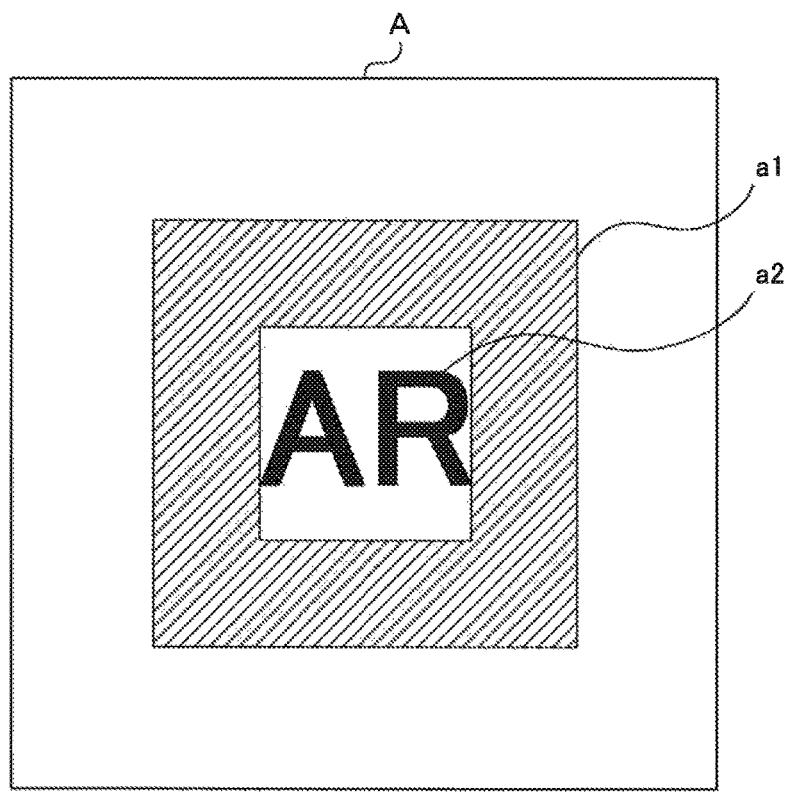
FIG. 6 illustrates an example marker.
FIG. 7 shows an example articles list.

FIG. 6 illustrates an example marker. In this example, the marker A is what is called an AR marker. The marker A may be in monochrome (black on white background) for ease of identification, or may be in multicolor for the purpose of using the colors as some information. The marker A includes a frame a1, which is in a predetermined shape, and an identification pattern a2, which is a visualization of identification information. In this example, the frame a1 is in a square of a predetermined size. The identification pattern a2 may be one or more characters or symbols, or may be a pattern composed of lines and/or dots arranged according to a predetermined rule.

The marker may be printed or otherwise attached on, for example, a slip for an article. For picking operations, slips are usually attached near their corresponding articles. The operator uses these slips to check the respective articles. The slip attached in this way is sometimes called a "NOREN". Such picking method may be called the "NOREN system". The present example embodiment can be described as having the feature that slips generally used for picking operations are utilized for teaching and picking operations.

The control unit 210 controls operations of the individual units in the picking support device 200. The control unit 210, which includes an arithmetic processing unit such as a CPU and a memory serving as main memory, controls operations of the individual units by executing programs. For example, the control unit 210 is capable of controlling the imaging performed by the camera unit 230 and the information output performed by the UI unit 240. In addition, the control unit 210 carries out the teaching and picking processing.

The storage unit 220 stores the data handled by the control unit 210. The storage unit 220 includes a storage medium such as a hard disk or a flash memory. The storage medium may be detachably attached to the picking support device 200, like a so-called memory card. Alternatively, the picking support device 200 may not be needed to include a storage medium itself, as long as the picking support device 200 includes a means for exchanging data with the storage medium.

The storage unit 220 is capable of storing, for example, programs and map data. In addition, the storage unit 220 stores an articles list that describes correspondence relations between articles and markers and a picking list that describes articles to be picked. The articles list and the picking list may be registered by, for example, the user before picking operations are started.

FIG. 7 shows an example articles list. The articles list at least includes, for example, the name of an article, which is the identification information regarding the article, and the marker's identification information associated with the article. The articles list may additionally include a shift amount representing the correspondence relation between the article position (more specifically, the informed position) and the marker position. The shift amount is a numeric value described in a predetermined coordinate system, representing the amount by which the article is displaced (shifted) from the marker position.

Figures 8, 9:
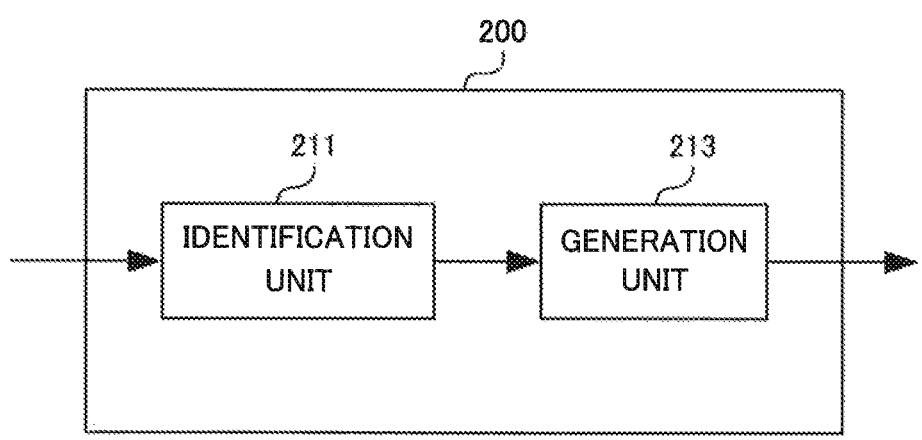
FIG. 8 shows an example picking list.
FIG. 9 is a block diagram illustrating a functional configuration of the picking support device 200.

FIG. 8 shows an example picking list. The picking list at least includes the name of an article to be picked. The picking list may include the number of article to be picked, the order of picking, a flag indicating whether the article has been picked, and remarks, but these information items are not essential. The remarks column may contain, for example, features of an article (size, mass, characteristic appearance, and the like). The picking list is an example of the aforementioned data of the informing-target.

Instead of being registered by the user in advance, the data in the picking list may be generated by the picking support device 200. For example, based on the size or mass described in the remarks column, the picking support device 200 may give ranks to the articles so that the articles are picked from the lightest or smallest one in ascending order. Alternatively, referring to the map data, the picking support device 200 may give ranks to the articles so as to minimize the user's travel distance needed for picking operations.

The camera unit 230 takes images of markers. The camera unit 230 includes one or more image sensors. In the present example embodiment, the camera unit 230 is a digital video camera, that is, a means of taking videos; however, the camera unit 230 may be a digital still camera, that is, a means of taking still images. In the present example embodiment, each frame taken by the camera unit 230 is equivalent to a captured image. The camera unit 230 provides a frame rate of about 30 frames per second (fps), but the frame rate is not limited to a specific value. The camera unit 230 may include the zooming or rotating function so as to change the imaging range.

Assuming that the camera unit 230 includes a plurality of image sensors, these image sensors may have different performance capabilities (such as angles of view, resolutions, and the like). Also assuming that the camera unit 230 includes a plurality of image sensors, and that the positional relation among these sensors is known, the control unit 210 can associate their coordinate systems with one another, and can transform coordinates information between different coordinate systems and thus describe coordinates information in a different coordinate system.

In generating map data, the camera unit 230 may not necessarily take images so that every image includes a plurality of markers. For example, in the case where the picking support device 200 takes videos while moving, some frames may possibly have an imaging range containing less than two markers. The picking support device 200 may discard such frame, if any, so that such frame is not used for generating map data.

The UI unit 240 gives and accepts information to and from the user. The UI unit 240 includes a display device such as a liquid crystal display, as an output means. Additionally, the UI unit 240 may be configured to include a speaker. The UI unit 240 may include a mouse or a keypad as an input means, or may include a touch screen display serving as both an input means and an output means.

Note that the UI unit 240 is not an essential component of the picking support device 200. The UI unit 240 may not necessarily be a component of the picking support device 200 but may be provided by a separate device (for example, what is called a smart phone or tablet terminal) that can communicate with the picking support device 200.

The light illuminating unit 250 emits a light so as to inform the user of a position. The light illuminating unit 250 includes a light source, such as a light emitting diode (LED) collimator illuminator that narrows incoherent light and emits it in the form of a beam, as well as including a driving means (for example, a camera platform or a motor) that moves or rotates the light source to change the direction of light emission. More specifically, the light illuminating unit 250 emits a light toward or around a marker (including the position where an article is stored).

The picking support device 200 is configured as above. The user can use the picking support device 200 configured in this manner for teaching operations and picking operations. The picking support device 200 has a first function and second function, where the first function is to generate map data, and the second function is to inform the position of an article based on the generated map data. The first function, which is used during teaching operations, is a function performed at a preparation stage so that the second function can be fulfilled. Later, the second function is used during picking operations.

FIG. 9 is a block diagram illustrating a functional configuration for the first function of the picking support device 200. In the picking support device 200, the functions equivalent to an identification unit 211 and a generation unit 213 are implemented through execution of a predetermined program performed by the control unit 210.

The functional configuration for a second function of the picking support device 200 is the same as the configuration of the information processing device 100 according to the first example embodiment (see FIG. 1). In other words, the control unit 210 in the picking support device 200 is configured so as to achieve both the functional configuration illustrated in FIG. 1 and the functional configuration illustrated in FIG. 9. However, these configurations need not be implemented by the same program.

By using image data representing a captured image that is taken by the camera unit 230 and that contains a marker, the identification unit 211 identifies the coordinates information and identification information regarding the marker. The coordinates information includes at least positional information regarding the marker and information about the attitude of the marker, as expressed in a predetermined coordinate system. The identification unit 211 uses a captured image containing two or more markers within an imaging range to identify the coordinates information that expresses a relative positional relation between or among these markers. The identification unit 211 identifies the coordinates information and identification information on a plurality of captured images.

The identification unit 211 is capable of identifying the distance between the marker and the reference position, based on a difference between the size of the marker in a capture image and its actual size. The reference position as mentioned here may be, for example, the position of the camera unit 230, that is, the imaging position. The identification unit 211 is also capable of identifying the attitude of a marker, based on a difference (or a distortion) between the shape of the marker in a capture image and its actual shape.

Note that the identification unit 211 can identify the distance and attitude regarding a marker by using a known technique.

The identification unit 211 identifies a relative positional relation between or among two or more markers included in a single captured image by using a predetermined coordinate system. However, the identification unit 211 need not use a common coordinate system to identify the position of every marker in the plurality of capture images. In other words, the identification unit 211 need only identify a relative positional relation between or among two or more markers by using any coordinate system appropriate for describing coordinates of markers included in the imaging range.

For example, when a captured image includes two or more markers, the identification unit 211 identifies the marker whose identification information represents the smallest number, and, using the position of this marker as the origin of a coordinate system, identifies the positions of other markers relative to the marker serving as the origin. For example, the identification unit 211 defines an x-axis and a y-axis on a plane that includes a marker, and, using a predetermined position (such as the center or vertex) of the marker as the origin, expresses a positional relation between or among markers in a three-dimensional orthogonal coordinate system whose z-axis is orthogonal to the x-y plane. In this case, the position of the origin varies among captured images.

Now, letting $(x_1, y_1, z_1)$ be coordinates in a first coordinate system based on the viewpoint, or the imaging position, used as the reference point, while $(x_2, y_2, z_2)$ be coordinates in a second coordinate system based on the position of a marker, these coordinate systems can be expressed vectorially by using a homogeneous transformation matrix, as in the following equation (1).

In this homogeneous transformation matrix, the elements in three rows by three columns starting from the upper left of the matrix represent an attitude (rotation elements), while the elements in the fourth column $(m_{14}, m_{24}, m_{34})$ represent a position (translation elements). Specific values of the homogeneous transformation matrix vary among captured positions, but are unique to each individual captured image.

[Equation 1]

$$\begin{pmatrix} x_1 \\ y_1 \\ z_1 \\ 1 \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{pmatrix} \begin{pmatrix} x_2 \\ y_2 \\ z_2 \\ 1 \end{pmatrix} \quad (1)$$

If a captured image includes a plurality of markers, the identification unit 211 can obtain a homogeneous transformation matrix for each of the markers. In addition, by using homogeneous transformation matrices for a plurality of markers based on a single imaging position, the identification unit 211 can obtain homogeneous transformation matrices based on the position (that is, the origin) of any one of the markers. For example, supposing that there are two markers having identification information "1" and "2", respectively, and letting $M_1$ and $M_2$ be their respective homogeneous transformation matrices, the following equation (2) is established. In this equation, $M_{12}$ represents a homogeneous transformation matrix indicating the position of the marker whose identification information is "2", relative to the position of the marker whose identification information is "1". In addition, $M_1^{-1}$ in the equation is an inverse matrix of the matrix $M_1$.

[Equation 2]

$$M_{12} = M_1^{-1} M_2 \quad (2)$$

When the position of the marker whose identification information is "1" is used as the reference, coordinates of the marker whose identification information is "2" are expressed by translation elements of the homogeneous transformation matrix $M_{12}$. Specifically, assuming that a value in the i-th row and the j-th column in a homogeneous transformation matrix $M_{12}$ is denoted as $M_{12}(i,j)$, coordinates of the marker whose identification information is "2" are expressed by the following equation (3):

[Equation 3]

$$x = M_{12}(1,4)$$

$$y = M_{12}(2,4)$$

$$z = M_{12}(3,4) \quad (3)$$

Note that image data may be directly supplied from the camera unit 230, or may be supplied from the camera unit 230 to the storage unit 220 and stored for a while. The order in which the identification unit 211 identifies the coordinates information and identification information may or may not be the same as the order in which captured images are taken.

In addition, a captured image does not necessarily include all the disposed markers captured at a time in the space for which map data is to be generated (that is, all the markers may not necessarily be included in a single imaging range); rather, only some of the markers may be included in a single imaging range. However, in order to be used for generating map data, each marker needs to be included in at least one of captured images along with another marker.

The identification pattern on a marker may include some information other than the identification information regarding the marker. For example, the identification pattern may include the information used by the user for picking operations. Examples of such information may include information related to an article (for example, name, part number, notes, delivery date, planned discard date, supplier name, and the like). When such information is identified in addition to the identification information, the identification unit 211 may record such identified information into the map data or the articles list.

The generation unit 213 generates map data, based on the marker positions and identification information, as identified by the identification unit 211 from each captured image. The generation unit 213 generates map data by using the identification information to transform coordinates of markers in different coordinate systems that depend on individual captured images into coordinates in a common coordinate system; in other words, the generation unit transforms coordinates described in non-uniform coordinate systems into those in a common coordinate system.

Figure 10:
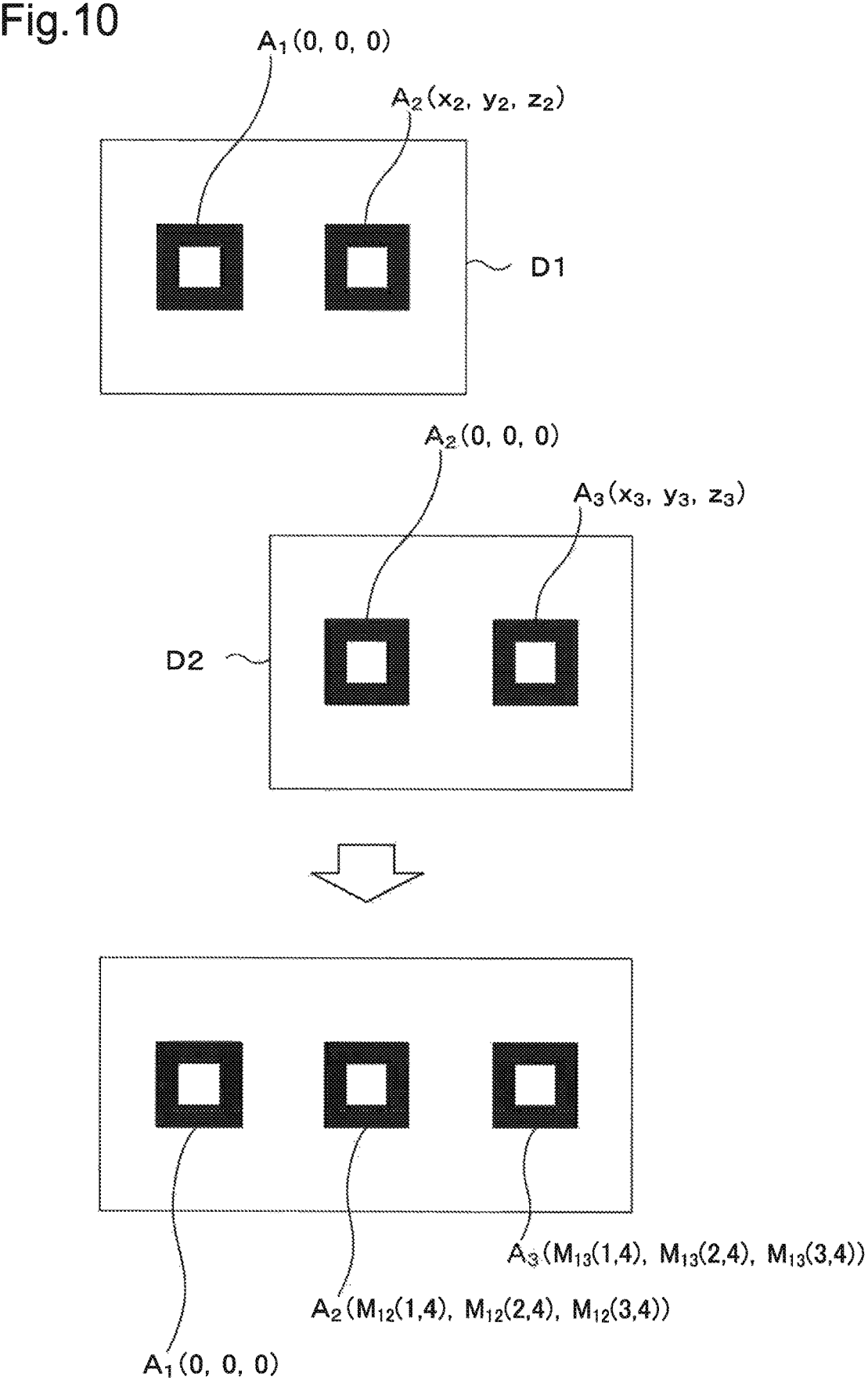
FIG. 10 illustrates coordinate transformations performed by the generation unit 213.

FIG. 10 illustrates coordinate transformations performed by the generation unit 213. In FIG. 10, image data D1, which represents a first captured image, includes markers $A_1$ and $A_2$. Coordinates of the markers $A_1$ and $A_2$ in the image data D1 can be expressed as $(0,0,0)$ and $(x_2, y_2, z_2)$, respectively, according to the foregoing equations (1) to (3). The image data D2, which represents a second captured image, includes markers $A_2$ and $A_3$, where a duplicate of the marker $A_2$ appears in the first captured image, while a duplicate of the marker $A_3$ does not appear in the first captured image. As in the first captured image, coordinates of the markers $A_2$ and $A_3$ can be expressed as $(0,0,0)$ and $(x_3, y_3, z_3)$, respectively.

Coordinates of the marker $A_2$ are different values between the image data D1 and the image data D2 because these two pieces of image data are in different coordinate systems. However, the generation unit 213 can recognize that these coordinates describe a single marker because these coordinates correspond to the same identification information. As long as a relative positional relation between these coordinate systems can be identified, the generation unit 213 can transform coordinates of the marker $A_3$ into those in a coordinate system in common with the image data D1, that is, the coordinate system with the marker $A_1$ serving as the origin.

To achieve this coordinate transformation, the generation unit 213 calculates the attitude of each marker. In the present example embodiment, the attitude of a marker is expressed in Euler angles. It is assumed here that the Euler angles are so-called Z-Y-X Euler angles representing rotation by $\gamma$, $\beta$, and $\alpha$ around the z-axis, the y-axis, and the x-axis, respectively in this order, but the Euler angles are not limited to such angles.

Given a homogeneous transformation matrix as expressed by the equation (1), the Euler angles are defined as in the following equation (4) by using inverse trigonometric functions. In this equation, atan 2(y,x) represents an arctangent function for obtaining a deviation angle of a point (x,y) on a two-dimensional plane, falling in a range of $-\pi \leq$ atan $2(y,x) < \pi$. Then, the homogeneous transformation matrix is expressed by the following equation (5) by using the Euler angles. Note that translation elements are 0 in the equation (5) for convenience of explanation.

[Equation 4]

$$\alpha = \mathrm{atan}\ 2(m_{32}, m_{33})$$

$$\beta = \arcsin(-m_{31})$$

$$\gamma = \mathrm{atan}\ 2(m_{21}, m_{11}) \quad (4)$$

[Equation 5]

$$\begin{pmatrix} \cos\beta\cos\gamma & \cos\gamma\sin\alpha\sin\beta - \cos\alpha\sin\gamma & \cos\alpha\cos\gamma\sin\beta - \sin\alpha\sin\gamma & 0 \\ \cos\beta\sin\gamma & \cos\alpha\cos\gamma - \sin\alpha\sin\beta\sin\gamma & -\cos\gamma\sin\alpha + \cos\alpha\sin\beta\sin\gamma & 0 \\ -\sin\beta & \cos\beta\sin\alpha & \cos\alpha\cos\beta & 0 \\ 0 & 0 & 0 & 1 \end{pmatrix} \quad (5)$$

Now, letting $M_{13}$ be the homogeneous transformation matrix describing coordinates of the marker $A_3$ in a coordinate system with its origin at the marker $A_1$, while letting $M_{23}$ be the homogeneous transformation matrix describing coordinates of the marker $A_3$ in a coordinate system with its origin at the marker $A_2$, the following equation (6) is established. In other words, the homogeneous transformation matrix $M_{13}$ can be expressed as a product of the homogeneous transformation matrix $M_{12}$ as expressed by the equation (2) and the homogeneous transformation matrix $M_{23}$. Note that the homogeneous transformation matrix $M_{23}$ can be calculated in the same way as for the homogeneous transformation matrix $M_{12}$ calculated by using the equation (2).

[Equation 6]

$$M_{13} = M_{12} M_{23} \quad (6)$$

In addition, coordinates of the marker $A_3$ $(x_3, y_3, z_3)$ can be expressed by the equation (7) in the same manner as in the equation (3).

[Equation 7]

$$x_3 = M_{13}(1,4)$$

$$y_3 = M_{13}(2,4)$$

$$z_3 = M_{13}(3,4) \quad (7)$$

That is, when a captured image includes a marker whose coordinate values are known in a new coordinate system subjected to coordinate transformation, and also includes another marker whose coordinate values are unknown in such coordinate system, the generation unit 213 can identify the coordinates of the marker, which are unknown in such coordinate system, by obtaining a product of homogeneous transformation matrices. Therefore, even when a plurality of markers are imaged in such a way that they are (not included in a single captured image but) distributed among a plurality of captured images, the generation unit 213 can describe coordinates of the plurality of markers in a common coordinate system by repeating matrix operations.

Figure 11:
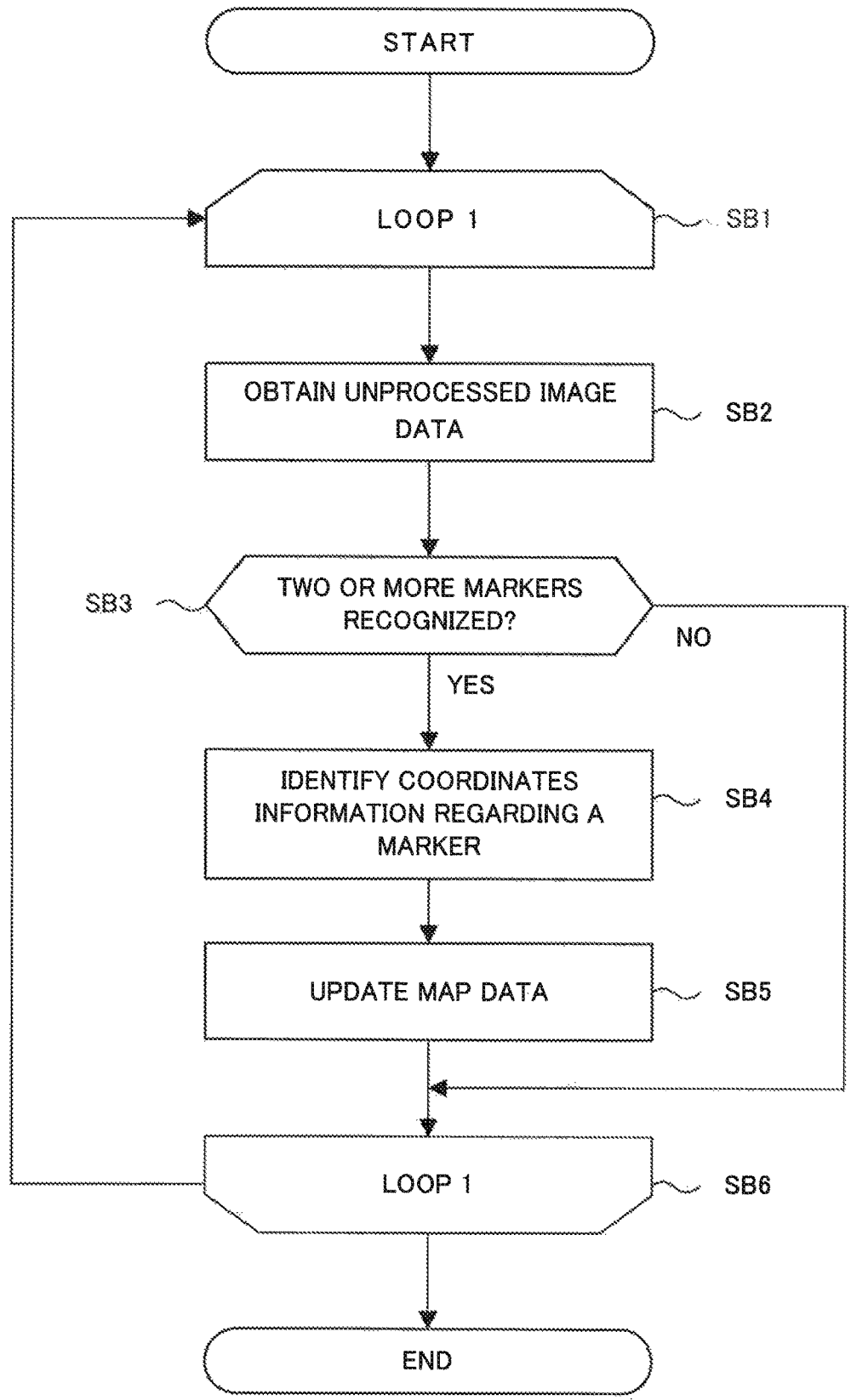
FIG. 11 is a flowchart illustrating teaching processing.

FIG. 11 is a flowchart illustrating the teaching processing carried out by the picking support device 200. The picking support device 200 repeatedly executes processes in the loop indicated in steps SB1 to SB6 until a predetermined termination condition is satisfied. Examples of the termination condition may include that the imaging means has finished imaging, that all the prepared image data has been processed, or that a predetermined number of markers have been processed.

In step SB2, the identification unit 211 in the picking support device 200 obtains any piece of unprocessed image data. The identification unit 211 may sequentially read pieces of the image data stored in the storage means, or may suspend the processing until any image data is supplied from the imaging means.

Having obtained a piece of image data, the identification unit 211 determines whether two or more markers can be recognized in the obtained piece of image data (step SB3). If two or more markers cannot be recognized, in other words if the number of markers included in the captured image is either 0 or 1 (NO in step SB3), the identification unit 211 skips processes in steps SB4 and SB5, which are described below.

For example, if the image data D1 illustrated in FIG. 10 is obtained, the identification unit 211 can recognize the markers $A_1$ and $A_2$, and thus makes a positive determination in step SB3. In contrast, if either or both of the markers $A_1$ and $A_2$ are out of the imaging range or cannot be recognized correctly, the identification unit 211 makes a negative determination in step SB3.

If two or more markers are recognized (YES in step SB3), the identification unit 211 identifies coordinates information regarding each of the markers (step SB4). In this step, the identification unit 211 identifies a relative positional relation between or among the markers. Thus, the coordinates identified in this step need not be consistent with the coordinate system used for map data.

Next, the generation unit 213 updates the map data (step SB5). The updating of map data, as mentioned here, refers to addition of information (coordinates information and identification information) about a new marker to the map data. When the map data is in the initial state, that is, when the map data contains no information about markers, the generation unit 213 simply adds the coordinates information and identification information regarding the markers that have been handled for the first time in step SB4 to the map data. For example, if the image data D1 illustrated in FIG. 10 has been obtained, the generation unit 213 simply adds the coordinates information and identification information regarding the markers $A_1$ and $A_2$ to the map data.

In contrast, if the map data already includes information about any marker, that is, during the second or subsequent round of the loop processing, the generation unit 213 determines whether the map data contains any information about the marker whose identification information is the same as that of the marker that has just been recognized. If the map data contains information about such marker, the generation unit 213 further determines whether any of the markers that have just been recognized is missing in the map data, and, if any marker is missing in the map data, the generation unit 213 transforms the coordinates of the marker.

For example, supposing that the image data D1 illustrated in FIG. 10 was obtained, that the markers $A_1$ and $A_2$ were already added to the map data, and that the image data D2 has newly been obtained, the generation unit 213 determines whether the map data contains information about any of the markers $A_2$ and $A_3$, which are included in the image data D2.

In this example, the marker $A_2$ is already added to the map data, and thus the generation unit 213 transforms the coordinates of the marker $A_3$ using the equations (6) and (7).

In case the information about a new marker fails to be added to the map data in step SB5, the generation unit 213 can temporarily save the information about the marker, and later add the information when it can be added to the map data. The failure to add the information about a new marker to the map occurs when the map data contains no identification information regarding any of the markers included in a captured image. Once identification information about at least one of the markers included in the captured image is added to the map data, information about other markers included in the capture image can be added to the map data.

The picking support device 200 can sequentially add information about a plurality of markers to the map data by repeating the loop processing from step SB1 to step SB6. Note that the picking support device 200 may move the origin of the coordinate system to any appropriate position after the loop processing is finished. In other words, the origin of map data is not limited to the position of the origin initially set in the teaching processing.

FIG. 12 shows an example of the map data generated by the picking support device 200. As in the first example embodiment, the map data includes at least identification information and coordinates information regarding a marker. Additionally, the map data may include other information such as the name of an article associated with the marker or how many times the marker has been recognized. The generation unit 213 can add the name of an article to the map data by using the articles list. The generation unit 213 may remove any marker that has been recognized with a frequency equal to or less than a predetermined threshold from the map data.

Figure 13:
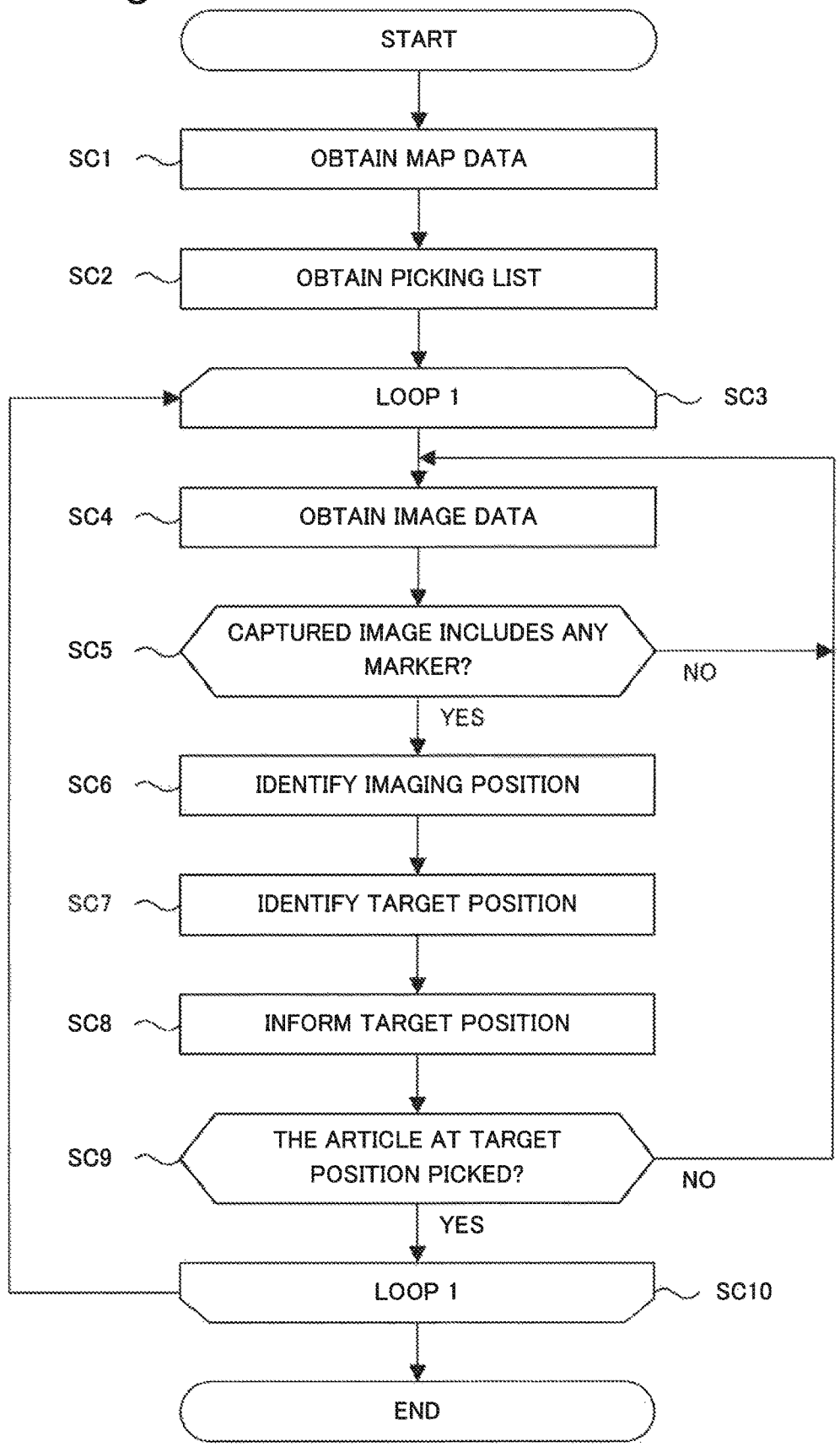
FIG. 13 is a flowchart illustrating picking processing.

FIG. 13 is a flowchart illustrating the picking processing carried out by the picking support device 200. Note that some steps included in the picking processing are the same as those performed by the information processing device 100 of the first example embodiment (see FIG. 3). Detailed descriptions of these steps are omitted as appropriate.

The control unit 210 in the picking support device 200 begins with obtaining the map data and the picking list from the storage unit 220 (steps SC1 and SC2). Next, the control unit 210 repeatedly executes processes in the loop as indicated in steps SC3 to SC7 until a predetermined termination condition is satisfied. Examples of the termination condition may include that all the articles contained in the picking list have been picked. The control unit 210 may also suspend or forcefully quit the loop processing when a predetermined user operation is accepted.

In step SC4, the control unit 210 obtains image data. In step SC5, the control unit 210 determines whether the captured image represented by the image data obtained in step SC4 includes any marker. If no marker is recognized in the captured image (NO in SC5), the control unit 210 repeats obtaining image data (step SC4) until any marker is recognized.

Having recognized a marker in a captured image (YES in SC5), the control unit 210 identifies the imaging position based on the recognized marker (step SC6). In addition, the control unit 210 identifies the target position based on the imaging position identified in step SC6 and the picking list obtained in step SC2 (step SC7). In this step, the control unit 210 sees ranks and flags contained in the picking list to select one of non-informed articles as the informing-target article. If any shift amount is assigned to the informing-target article, the control unit 210 determines the target position by adding the shift amount to the marker position.

In step SC8, the control unit 210 informs the user of the target position. For example, the control unit 210 controls the light illuminating unit 250 so that the target position is irradiated with a light. Alternatively, the control unit 210 may cause the UI unit 240 to display a route from the current user position to the target position and/or a variety of information regarding the article.

In step SC9, the control unit 210 determines whether the user has picked the article corresponding to the target position. Having picked the informing-target article, the user performs a predetermined operation via the UI unit 240 in accordance with an instruction given by the picking support device 200. Upon accepting the operation (YES in SC9), the control unit 210 switches to any non-informed article, as the informing-target article, to repeat steps SC3 to SC10.

When the predetermined operation is not performed (NO in SC9), the control unit 210 repeats the processes starting from step SC4. In this way, even when the picking support device 200 moves along with the user, and accordingly the imaging position and imaging direction are changed, the picking support device 200 can re-identify the target position relative to the new imaging position, and can correctly inform the user of the identified target position.

According to the present example embodiment, both the teaching processing and the picking processing can be performed with a single device. The picking support device 200 can perform the picking processing by using the map data generated through the teaching processing. In addition, the user need not use different devices depending on the operation: teaching or picking.

Furthermore, according to the present example embodiment, positions of articles need not be determined in advance because the position of every article is identified by its corresponding marker. Thus, according to the present example embodiment, the shelf layout and article storage spaces can be changed more easily. When an article (and its marker) have been moved, the user need only re-create the map data by performing the teaching operation again.

In addition, the picking support device 200 identifies the imaging position and then informs the target position based on map data, and thus can inform the target position regardless of whether the target position is included in the imaging range.

Furthermore, the picking support device 200 can irradiate the same position with a light even when the imaging position has changed, because the picking support device 200 continuously obtains image data and repeatedly identifies the imaging position and the target position.

Third Example Embodiment

The present example embodiment is a variation of the above-described second example embodiment. The present example embodiment is similar to the second example embodiment with regard to an overall configuration, but differs from the second example embodiment in the functions implemented by the picking support device 200 (in particular, functions related to the teaching processing). Note that symbols given in the present example embodiment identical to those in the second example embodiment represent the same components described above in the second example embodiment. In the present example embodiment, descriptions of the matters in common with the second example embodiment are omitted.

Figure 14:
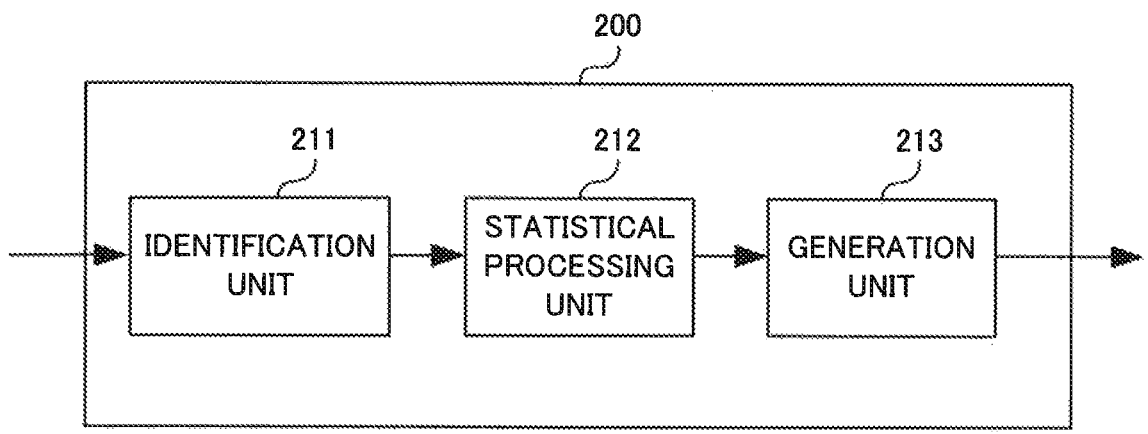
FIG. 14 is a block diagram illustrating a functional configuration of the picking support device 200.

FIG. 14 is a block diagram illustrating a functional configuration for the first function of the picking support device 200. In the picking support device 200, the functions equivalent to a statistical processing unit 212 in addition to the identification unit 211 and the generation unit 213 are implemented through execution of a predetermined program performed by the control unit 210.

The statistical processing unit 212 performs statistical processing on the coordinates information or the identification information identified by the identification unit 211. The statistical processing, as mentioned here, refers to analyzing a plurality of numerical values identified by the identification unit 211, and sorting out some values if necessary. For example, the statistical processing unit 212 discards any identification information having misidentification or any coordinates information having a superposed error. In this case, the generation unit 213 generates map data excluding any value discarded by the statistical processing unit 212. The statistical processing unit 212 is capable of discarding identification information having misidentification and coordinates information having a superposed error by, for example, using the Kalman filter or particle filters. Additionally, by utilizing the feature that the same marker repeatedly appears in a plurality of frames of captured images, the statistical processing unit 212 may discard the identification information or coordinates information regarding a certain marker that appears relatively infrequently in the frames.

The teaching processing according to the present example embodiment is the same as that of the second example embodiment (see FIG. 11). However, in addition to the processes in FIG. 11, the picking support device 200 may carry out the process of discarding any identification information having misidentification or any coordinates information having a superposed error. Furthermore, if a plurality of captured images include the same marker, as determined by the identification information, the picking support device 200 may use only one of such plurality of captured images to identify the coordinates of the marker. Alternatively, if a plurality of captured images include the same marker, as determined by the identification information, the picking support device 200 may identify the coordinates of each of the markers in the captures images and use their average or median value to generate map data.

Note that the picking support device 200 may carry out the teaching processing while the camera unit 230 is capturing images, or may perform the processing after the camera unit 230 finishes capturing images, that is, after all the marker images are taken. Additionally, if any information regarding a marker is discarded, the picking support device 200 may prompt the camera unit 230, through the UI unit 240, to capture the image again.

The picking support device 200 may use any one of the positions of markers as the origin of map data, or may use a predetermined position in a space as the origin of map data. Furthermore, the picking support device 200 may accept an input given by the user specifying an origin.

According to the present example embodiment, with the statistical processing unit 212, the map data can be made more accurate due to reduction in the influence of conditions (brightness, for example) under which the camera unit 230 captures images or of occlusion of part of a marker caused by another object (a person) appearing in the image.

Fourth Example Embodiment

The present example embodiment is a variation of the above-described third example embodiment. The picking support device 200 of the present example embodiment differs from that of the third example embodiment in the functions related to the teaching processing. In the present example embodiment, descriptions of the matters in common with the second or third example embodiment are omitted.

Figure 15:
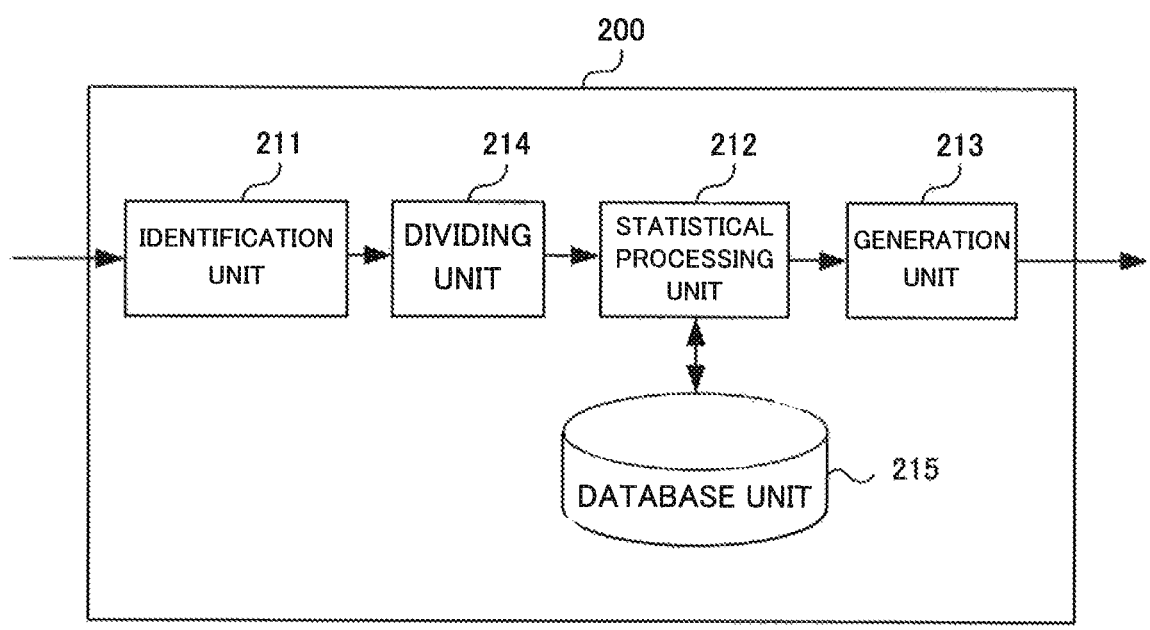
FIG. 15 is a block diagram illustrating a functional configuration of the picking support device 200.

FIG. 15 is a block diagram illustrating a functional configuration for the first function of the picking support device 200. In the picking support device 200, in addition to the functions of the identification unit 211, the statistical processing unit 212, and the generation unit 213, the functions equivalent to a dividing unit 214 and a database unit 215 are implemented through execution of a predetermined program performed by the control unit 210.

If a captured image includes three or more markers, the dividing unit 214 divides a combination of the markers to define a plurality of pairs. The dividing unit 214 turns three or more markers included in a captured image into pairs, each of which is composed of adjacent markers. Adjacent markers, as mentioned here, means two successive markers along a direction, the two markers being a combination (pair) of markers with no other marker included in between seen in the direction. The coordinates and the identification information regarding a pair are hereinafter collectively called "pair data". Pair data is stored in the database unit 215.

The statistical processing unit 212 is the same as in the third example embodiment in that it performs statistical processing, but differs from that of the third example embodiment in that the statistical processing is performed on pair data. More specifically, the statistical processing unit 212 of the present example embodiment serves as a means for calculating a reliability of a pair of markers. The statistical processing unit 212 stores each piece of pair data into the database unit 215 and, if necessary, reads the piece of pair data to calculate its reliability. The generation unit 213 differs from that of the third example embodiment in that map data is generated by using the reliability calculated by the statistical processing unit 212.

Figure 16:
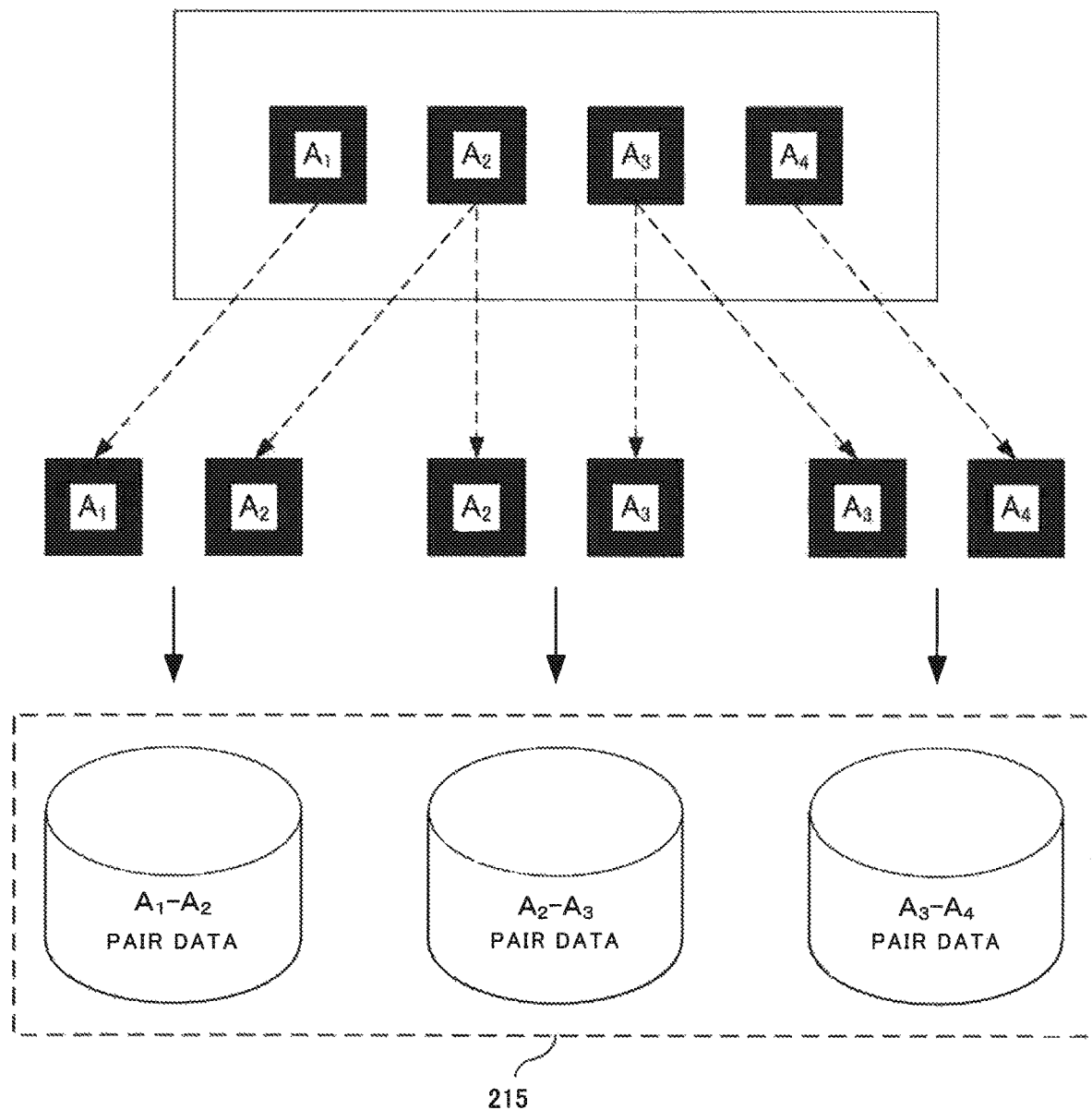
FIG. 16 is an explanatory diagram illustrating a pair of markers.

FIG. 16 is an explanatory diagram illustrating a pair of markers according to the present example embodiment. Although in this example markers are arranged along a single direction for convenience of explanation, markers may be arranged along a plurality of directions and marker pairs may be defined along such plurality of directions.

Supposing that a single captured image includes markers $A_1, A_2, A_3$, and $A_4$ as illustrated in FIG. 16, the dividing unit 214 divides these markers into three pairs of markers: $A_1$-$A_2$, $A_2$-$A_3$, and $A_3$-$A_4$. The database unit 215 stores pair data on each of these pairs. More than one piece of pair data may exist for the same pair. For example, when the same pair is included in a plurality of captured images, a plurality of pieces of pair data about the same pair are recorded in the database unit 215.

Figure 17:
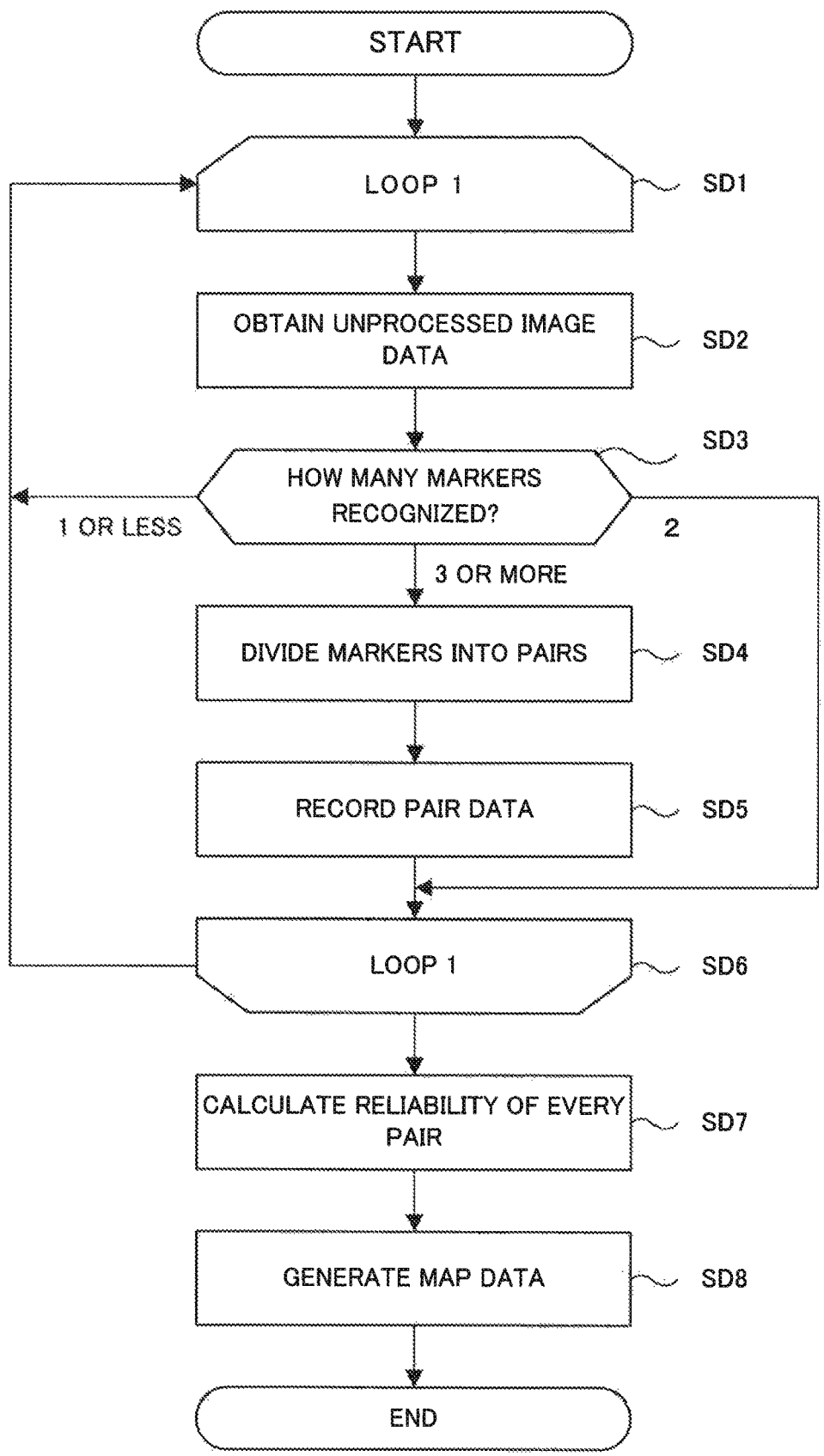
FIG. 17 is a flowchart illustrating teaching processing.

FIG. 17 is a flowchart illustrating teaching processing. The picking support device 200 repeatedly executes processes in the loop indicated in steps SD1 to SD6 until a predetermined termination condition is satisfied. Examples of the termination condition may include that pair data of a predetermined number of markers has been recorded, or that the loop processing has been repeated a predetermined number of times or for a predetermined time period. Alternatively, the picking support device 200 may terminate the loop processing in response to an operation by the user.

In step SD2, the identification unit 211 in the picking support device 200 obtains any piece of unprocessed image data. Next, the identification unit 211 recognizes any marker in the image data that was obtained in step SD2 and determines the number of recognized markers (step SD3). Specifically, the identification unit 211 performs different processes that depend on the number of recognized markers: one or less, two, or three or more.

In the case where three or more markers were recognized in step SD3, the dividing unit 214 divides the markers into a plurality of pairs (step SD4). In the case where two markers were recognized in step SD3, the captured image is deemed to include only one pair of markers. In this case, the dividing unit 214 skips the process in step SD4. In the case where one or less marker was recognized in step SD3, the dividing unit 214 skips the processes in steps SD4 and SD5.

In step SD5, the dividing unit 214 identifies coordinates of markers constituting a pair and records the pair data. When generating a plurality of pieces of pair data from the same image data, the dividing unit 214 may use different coordinate systems for those pieces of pair data. For example, with respect to each piece of pair data, the dividing unit 214 uses the position of one particular marker included in the pair data as the origin, and calculates coordinates based on the origin's positional relation to the other marker. To record pair data on the same pair subsequently, the dividing unit 214 uses the position of the particular one marker as the origin.

When the loop processing is repeated until a termination condition is satisfied, the statistical processing unit 212 calculates a reliability of every pair (step SD7). The reliability may be, for example, the reciprocal of the standard deviation of coordinates information (position and attitude) regarding markers constituting a pair. The reliability is a smaller (lower) value as there is a greater amount of variability of coordinates information between or among a plurality of pieces of pair data. In other words, the reliability is a greater (higher) value as the coordinates of markers constituting a pair contain fewer errors. The statistical processing unit 212 need not calculate the reliability of a pair if the database unit does not contain a plurality of pieces of pair data on the pair.

When reliabilities of all the pairs have been calculated, the generation unit 213 generates map data (step SD8). When generating the map data, the generation unit 213 preferentially use a pair having a higher reliability level. Specifically, the generation unit 213 starts with adding the most reliable pair to map data. In this step, when two or more sets of coordinates of the same pair are identified, the generation unit 213 uses their average values as the coordinates. Concerning any pair whose reliability is below a predetermined threshold or whose reliability cannot be calculated, the generation unit 213 need not add the coordinates information regarding this pair to the map data.

As seen above, according to the present example embodiment, reliabilities can be evaluated during map data generation by making a pair of adjacent markers and identifying the positional relation between the markers. Therefore, according to the present example embodiment, more accurate map data can be provided by preferentially using a pair having a higher reliability.

Fifth Example Embodiment

The present example embodiment is a variation of the above-described second (or third or fourth) example embodiment. The present example embodiment differs from the second example embodiment in that two types of markers are used as described below. In this connection, some operations of the picking support device 200 of the present example embodiment also differ from those of the second example embodiment.

FIG. 18 shows examples of markers Aa and Ab, which are used in the present example embodiment. The marker Aa, which is the same as that in the second and other example embodiments, includes a frame a1 and an identification pattern a2. The other marker Ab differs from the marker Aa in that the identification pattern a2 is absent. In other words, the marker Ab includes the frame a1 only.

The marker Aa is used for generating map data and for identifying an imaging position. On the other hand, the marker Ab is used for registering the position of an article with the map data. For convenience of explanation, the marker Aa and the marker Ab are hereinafter called a "map marker" and an "article marker", respectively.

The article marker need only be present when the teaching processing is performed. Thus, the article marker may be removed after map data is generated. In addition, an image of the article marker is needed to be taken only once by the camera unit 230. In contrast, the map marker is needed for both the teaching processing and the picking processing. Thus, the map marker must remain at the same position after map data is generated. Note that the map marker need not be associated with a particular article.

Figure 19:
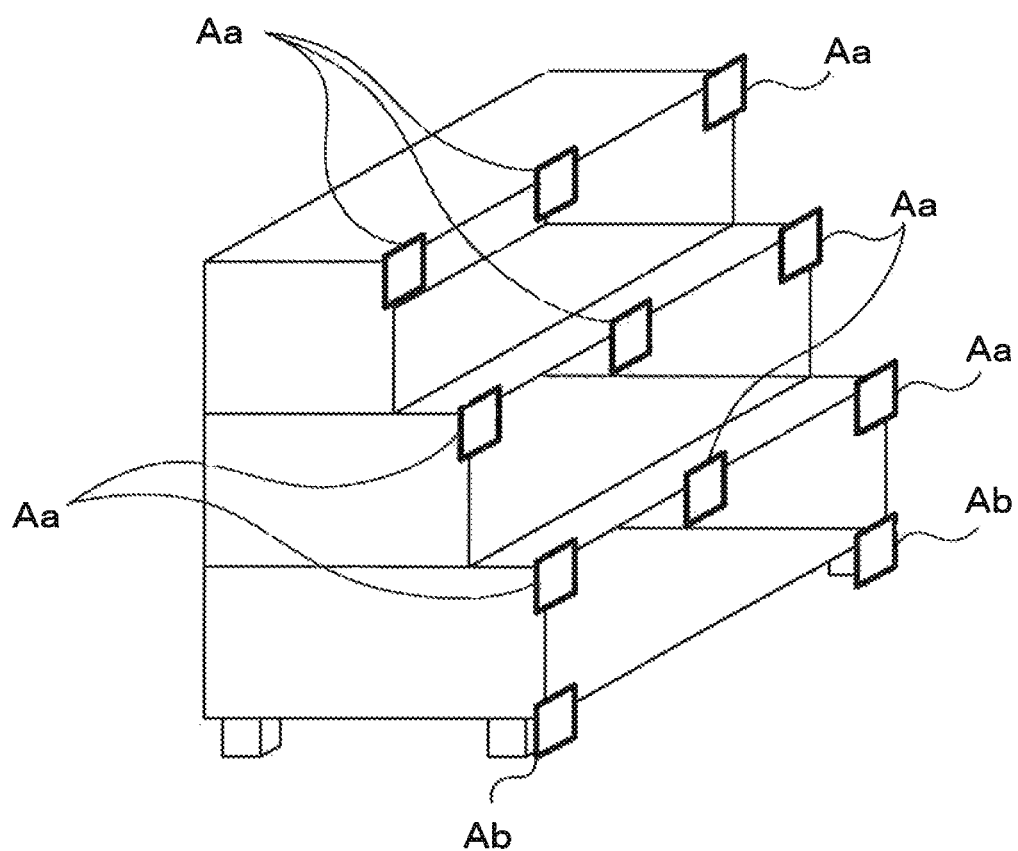
FIG. 19 illustrates an example of the state where markers are disposed on shelves.

FIG. 19 illustrates an example of the state where markers are disposed on shelves. The map marker is preferably disposed at a leg of a shelf or any other place so as not to obstruct entry or removal of articles. In contrast, the article marker is preferably disposed near its corresponding article. The article marker may be attached to an article with an adhesive tape so that the article marker can be easily removed. Alternatively, the article marker may be imaged while being held in the hand of the user, because the article marker need only be present at a predetermined position when its image is taken.

For both the teaching processing and the picking processing, the picking support device 200 performs operations almost the same as those in the third example embodiment. However, the map data generated through the teaching processing is different from that generated in the third example embodiment.

FIG. 20 shows an example of the map data according to the present example embodiment. Note that a record (row) containing identification information in this figure represents the data corresponding to a map marker. Also note that a record containing no identification information in this figure represents the data corresponding to an article marker.

This map data differs from the map data of the third example embodiment (see FIG. 12) in that the Name fields are blank. Map markers are not associated with articles, and thus have no corresponding articles. In addition, article markers have no identification information (identification pattern a2), and thus their corresponding articles are unknown as of the time when map data is generated.

In the present example embodiment, the name of an article is assigned to an article marker by the user. For example, at a time when an image of an article marker is taken during the teaching operation, the user enters the article name corresponding to the marker via the UI unit 240. If the picking support device 200 has stored data representing approximate positional relations among articles, the picking support device 200 can display names of articles located near the recognized article marker in the form of a list of options (i.e., candidates) on the UI unit 240 during the user operation. This can aid the user in entering the name.

In the present example embodiment, the camera unit 230 may include an image sensor for imaging article markers and another image sensor for imaging map markers. In this case, a map marker may be disposed under certain restrictions, including, for example, that the map marker should be placed at a height within 30 cm from the floor surface.

In the present example embodiment, if the device is configured so that an article marker and a map marker are imaged by different image sensors, each image sensor can be optimized depending on the marker to be imaged. For example, the image sensor for imaging an article marker need only recognize the shape of a marker because no identification information is recorded on the article marker. Hence, the image sensor for imaging article markers is not required to have a resolution as high as that of the image sensor used for imaging map markers. Alternatively, article markers may be smaller than map markers. Such smaller article markers refrain from interfering with entry and removal of articles, compared with larger article markers.

In addition, the image sensor for imaging map markers can have a smaller imaging range because such image sensor is not subject to any restriction related to article markers, in other words, a restriction related to the position of an article. For example, supposing that map markers are placed within a range of 30 cm in height from the floor surface, the image sensor for imaging the map markers need only capture images in this range, and thus need not have a greater angle of view in the vertical direction.

Although the marker Ab according to the present example embodiment is described, for convenience of explanation, as a marker composed of the frame a1 only without the identification pattern a2, the marker Ab may include a recorded identification pattern a2 (not identical to that of the marker Aa) of a particular type. In this case, the picking support device 200 recognizes a marker and determines that it is an article marker if the identification pattern is of a particular type, while determining that it is a map marker if the identification pattern is not of the particular type. Furthermore, concerning the identification pattern of a particular type, the picking support device 200 need only use the pattern for the purpose of distinguishing markers without regard to what the identification pattern specifically expresses.

Sixth Example Embodiment

The present example embodiment is a variation of the above-described fifth example embodiment. The present example embodiment uses two different markers (article marker and map marker) as in the fifth example embodiment, but differs from the fifth example embodiment in that an article marker includes a recording medium where information about the article is recorded.

The recording medium according to the present example embodiment may be, for example, what is called a radio frequency identification (RFID) tag or a magnetic recording tape. In short, while information is entered by the user via the UI unit 240 in the fifth example embodiment, the information is recorded in the recording medium in the present example embodiment. The information recorded in the recording medium is hereinafter called "article information".

In the case where a slip is used as the article marker (and as the recording medium) of the present example embodiment, the slip contains information about an article and a graphic equivalent to the frame a1, and further includes a recording medium that allows the information and the graphic to be read by a reader terminal 300 as described below. The recording medium may contain, as the article information, the information appearing on a slip.

Figure 21:
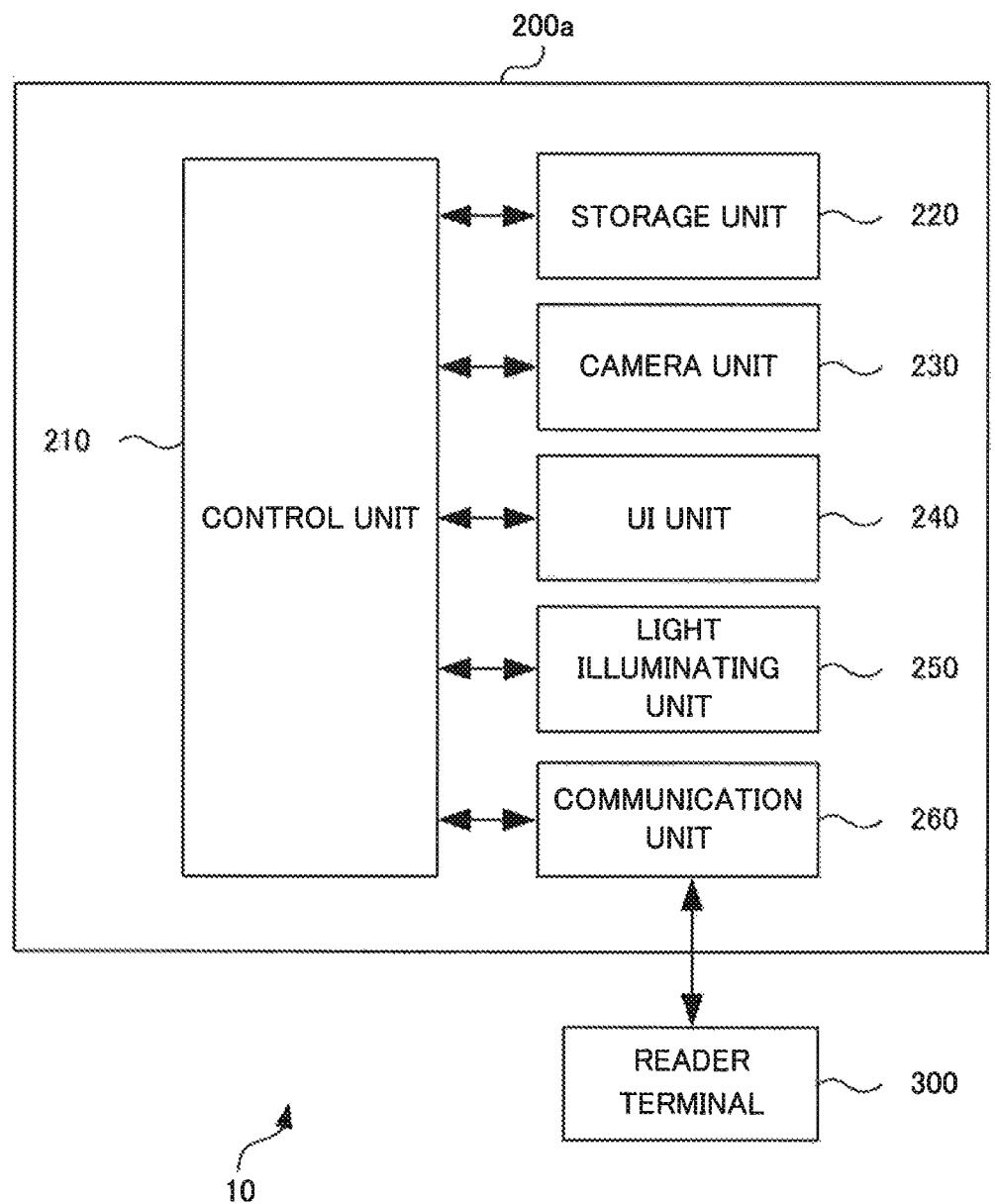
FIG. 21 is a block diagram illustrating a hardware configuration of the picking support system 10.

FIG. 21 is a block diagram illustrating a hardware configuration of a picking support system 10 according to the present embodiment. The picking support system 10 is an information processing system that includes the picking support device 200a and a reader terminal 300. Except that the picking support device 200a includes a communication unit 260, it has the same hardware configuration as that of the picking support device 200.

The communication unit 260 transmits/receives data to/from the reader terminal 300. The communication unit 260 is capable of receiving article information that is recorded in the storage medium and supplying the article information to the control unit 210. In other words, the control unit 210 of the present example embodiment additionally serves as a means for obtaining article information. Note that the communication unit 260 may have a wired or wireless connection to the reader terminal 300.

The reader terminal 300 is a device held by the user and used for reading article information recorded in the recording medium. Preferably, the reader terminal 300 is sized so as to allow the user to hold the terminal in his/her hand or to wear on his/her hand or arm. When the reader terminal 300 is held over a recording medium by the user and recognizes the recording medium within a predetermined range, the reader terminal 300 communicates with the recording medium to receive the article information.

The teaching processing and the picking processing according to the present example embodiment are almost the same as in the fifth example embodiment. The difference is that the user uses the reader terminal 300 to read article information form the recording medium during the teaching operation. The picking support device 200a receives article information from the reader terminal 300, and then records the article information into map data. In the present example embodiment, it is assumed that the user moves the picking support device 200a but, while information is read from the recording medium, the user puts the picking support device 200a at a standstill.

The control unit 210 in the picking support device 200a generates map data based on the result of imaging performed by the camera unit 230 and of the article information obtained from the communication unit 260. For example, at a time when the reader terminal 300 reads article information, the control unit 210 identifies the position of the reader terminal 300 from a captured image, and assigns the article information to the article marker closest to the reader terminal 300. In this way, article information can be associated with an article marker.

Alternatively, at a time when the reader terminal 300 reads article information, the control unit 210 may recognize a map marker in a captured image, and assign the article information to the map marker. In this case, a slip may not necessarily contain an article marker.

FIG. 22 shows an example of the map data containing article information assigned to map markers. The map data of the present example embodiment differs from that of the fifth example embodiment (see FIG. 20) in that article names are recorded. The map data of the present example embodiment also differs from that of the fifth example embodiment in that the position of a map marker is recorded as the position of an article placed near the map marker (that is, the position of a map marker is reused).

For example, the coordinates information regarding the map marker whose identification information is "00001" is used as the coordinates information regarding "Component B". In this case, "Component B" is stored near the map marker whose identification information is "00001", whereas "Component C" and "Component D" are stored near the map marker whose identification information is "00002".

As seen in FIG. 22, the control unit 210 may generate map data in which a plurality of articles are associated to (the position of) a single map marker. In spite of such associations, the user can find an approximate position of an article during picking operations. In this case, the user can grasp an approximate position of the article to be picked, based on the signification by the picking support device 200a, and then find the article located near the position (that is, the position of the map marker).

If article information includes identification information regarding the article, the control unit 210 may add the identification information to the map data. For example, with reference to the example in FIG. 22, the identification information regarding "Component B", "Component C", and "Component D" is "12345", "54321", and "67890", respectively. The article information may also include other information, such as a shift amount as described above.

During the picking operation following the teaching operation, the user reads information from the recording medium corresponding to the article that has just been picked by the user. This operation allows the control unit 210 to make the determination in step SC9 (see FIG. 13) depending on whether the article information has been obtained. In this case, the control unit 210 can determine whether the user has picked a correct article based on the article information. Upon obtaining the article information, the control unit 210 switches to a non-informed article, as the informing-target article, to repeat steps SC3 to SC10.

Note that the recording medium of the present example embodiment is not limited to RFID tags or magnetic recording tapes. For example, the recording medium of the present example embodiment may be a barcode, a QR code, a hologram, or a sticker on which the product name and other information are printed visibly or invisibly (with an infrared absorbing material or the like). In sum, the recording medium of the present example embodiment may employ any recording method as long as article information can be read from the recording medium. Furthermore, the recording method employed for the recording medium is not limited to a magnetic or optical method as mentioned above.

Alternatively, the present example embodiment may be configured to include an identification device for identifying article information, instead of including the reader terminal 300. The identification device mentioned here refers to, for example, a device that is used for identifying an article by recognizing an element (color, shape, characters, or the like) characteristic of the article in a captured image showing part or all of the article, thereby identifying the article information that is associated with the article in advance. Using such identification device also eliminates the need for a recording medium. Such identification device may be implemented by using the control unit 210 and the camera unit 230.

Seventh Example Embodiment

The present example embodiment is a variation of the above-described sixth example embodiment. The present example embodiment differs from the sixth example embodiment in that article markers are unnecessary. In the present example embodiment, a marker similar to the article marker Ab illustrated in FIG. 18, that is, a marker formed of the frame a1 only, is used instead of article markers. This marker is posted on the reader terminal 300. The reader terminal 300 of the present example embodiment is assumed to be brought to a predetermined area close to the recording medium to read article information.

For example, a paper sheet or sticker recording a marker is attached on the reader terminal 300. Alternatively, in the case where the reader terminal 300 includes a display unit like a liquid crystal display, the marker is displayed on the display unit. In either case, the marker is posted at any position that allows the camera unit 230 to take an image of the marker when the user is operating the reader terminal 300. Note that this marker is only needed for teaching operations, and not necessary for picking operations.

In the present example embodiment, the control unit 210 in the picking support device 200a uses the marker posted on the reader terminal 300 as an article marker to generate map data. During teaching operations, the user brings the reader terminal 300 closer to an article to read the article information.

FIG. 23 shows an example of the map data according to the present example embodiment. The map data of the present example embodiment differs from that of the sixth example embodiment (see FIG. 22) in that coordinates information regarding a map marker is not reused as coordinates information regarding an article. In the present example embodiment, the coordinates information regarding an article represents the current position of the reader terminal 300, which has just read the article information. In sum, at a time when article information has been read, the control unit 210 in the picking support device 200a identifies the marker posted on the reader terminal 300 in a captured image, associates the article information obtained through the communication unit 260 with the coordinates information representing the position of the marker, and records such associated information into the map data.

(Variations)

The present invention can be carried out according to an embodiment different from the above-described example embodiments. For example, the following variations can be applied to the present invention. In addition, the present invention can be carried out by using any combination of these example embodiments and variations or by replacing part of these example embodiments and variations with another part thereof.

(1) Variation 1

The picking support device 200 may use the number of identifications of a pair as the reliability of the pair. For example, a pair generated through incorrect recognition of identification information regarding markers is likely to be identified less frequently than pairs generated otherwise. In contrast, a pair that is more often identified, that is, a pair of markers whose images are more often captured, is expected to provide the positional relation being more accurately identified. Hence, the statistical processing unit 214 gives a higher reliability to a pair that has been more frequently identified as the same pair.

For example, the generation unit 213 may generate map data without using any pair whose reliability is less than a predetermined threshold. Alternatively, the generation unit 213 may generate map data only using those pairs whose number of identifications is among the top 80%, or those pairs whose number of identifications accounts for 10% or higher of the highest number of identifications of a pair.

(2) Variation 2

The picking support device 200 may determine the order of adding pairs to map data in accordance with the number of identifications of a pair. For example, the generation unit 214 may preferentially add a pair that has been more often identified to the map data.

FIG. 24 illustrates an example list of pairs and their numbers of identifications (the list is hereinafter called a "descending order list"). The descending order list ranks pairs of markers from the highest number of identifications (that is, listed in the descending order). The descending order list also includes a list of addition flags indicating whether the pair has been added to the map data. The picking support device 200 stores such descending order list in the storage unit 220 and updates the list when the map data is updated. Note that the marker $A_x$ in this example represents a marker whose identification information has been incorrectly recognized.

Figure 25:
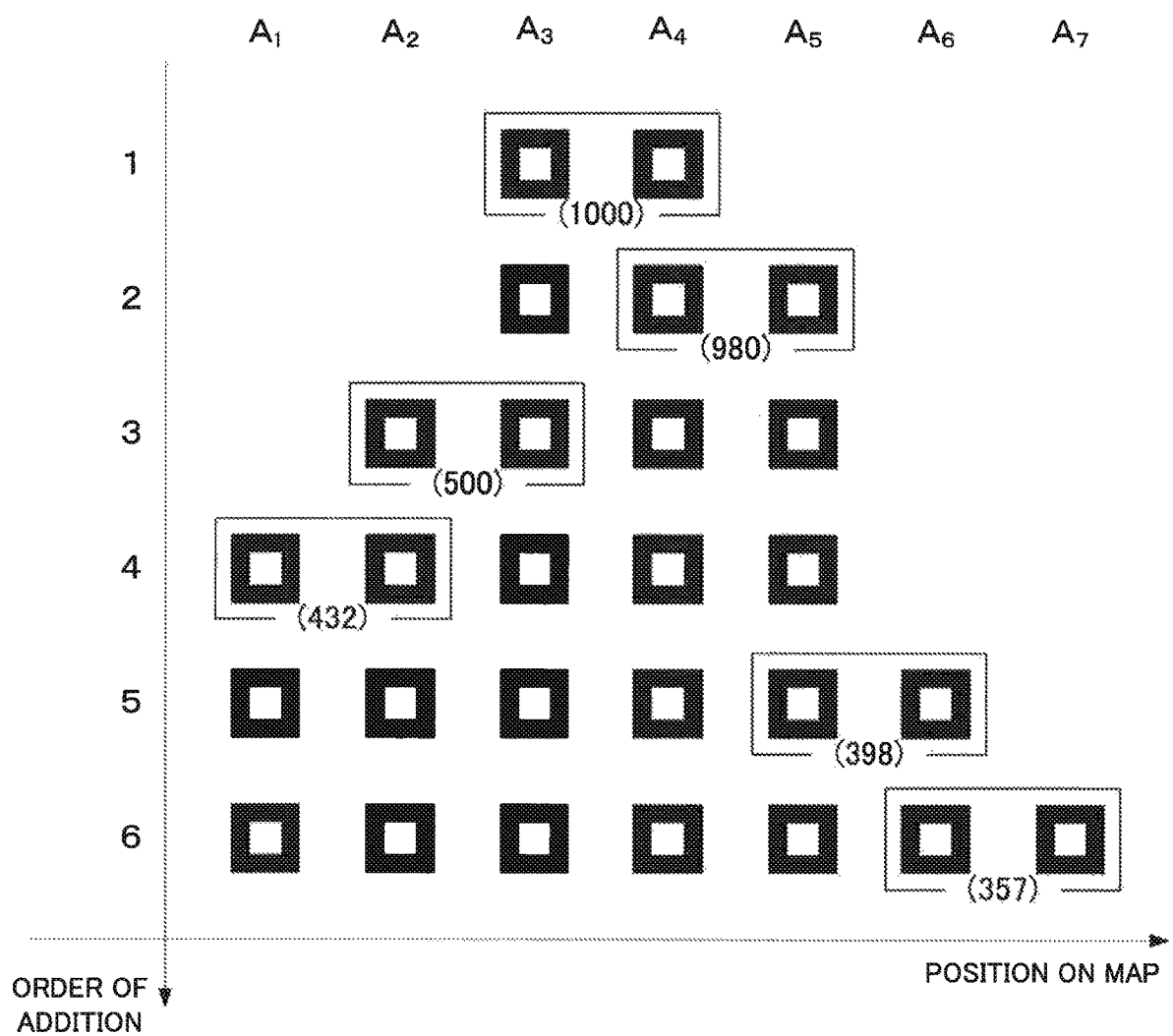
FIG. 25 illustrates an example order of adding pairs to map data.

FIG. 25 illustrates an example order of adding pairs to map data. If the descending order list as illustrated in FIG. 24 is stored, the generation unit 213 adds pairs to the map data in the order shown in FIG. 25. The generation unit 213 starts with adding the pair having the largest number of identifications to the map data. In the example in FIG. 25, the pair of markers $A_3$-$A_4$ has the largest number of identifications. Having added the pair of markers $A_3$-$A_4$ to the map data, the generation unit 213 changes the addition flag corresponding to the pair from "0" to "1".

Next, the generation unit 213 refers to the descending order list and searches the list for any pair that has the addition flag set to "0" and contains a marker that is already added to the map data. In other words, the generation unit 213 searches for a pair composed of a marker that has already been added to the map data and a marker that has not been added to the map data. When two or more pairs match the search criteria, the generation unit 213 gives a higher priority to the pair having the larger number of identifications and adds the pair to the map data first.

Referring now to FIG. 25, it is seen that any pair that includes either marker $A_3$ or marker $A_4$ can be added to the map data following the pair $A_3$-$A_4$. That is, either the pair of markers $A_2$-$A_3$ or the pair of markers $A_4$-$A_5$ can be subsequently added to the map data. According to the descending order list, the generation unit 213 first adds the pair of markers $A_4$-$A_5$, which has a greater number of identifications, to the map data.

After the generation unit 213 adds the pair of markers $A_4$-$A_5$, any pair that includes either marker $A_3$ or marker $A_5$ can now be added to the map data. That is, either the pair of markers $A_2$-$A_3$ or the pair of markers $A_5$-$A_6$ can be subsequently added to the map data. According to the descending order list, the generation unit 213 first adds the pair of markers $A_2$-$A_3$, which has a greater number of identifications, to the map data.

After that, the generation unit 213 sequentially adds markers $A_1$ to $A_7$ in the same manner as described above. Note that this example assumes that the generation unit 213 adds any pair that has the number of identifications equal to or greater than a predetermined threshold ("100" in the example) to the map data. Thus, pairs having the number of identifications less than 100 are not added to the map data in this example.

As seen above, the picking support device 200 can make map data highly accurate by using the descending order list, compared with the case where markers are added to the map data irrespective of the number of identifications of a pair.

(3) Variation 3

The picking support device 200 may generate map data excluding any outlier in pair data. The outlier, as mentioned here, means a piece of pair data on the same pair as recorded in the database unit 215, the piece of pair data having values of coordinates or attitude (x, y, z, $\alpha$, $\beta$, $\gamma$) that are significantly different from those of other pieces of the pair data. The picking support device 200 can identify an outlier by, for example, using the standard deviation.

Figure 26:
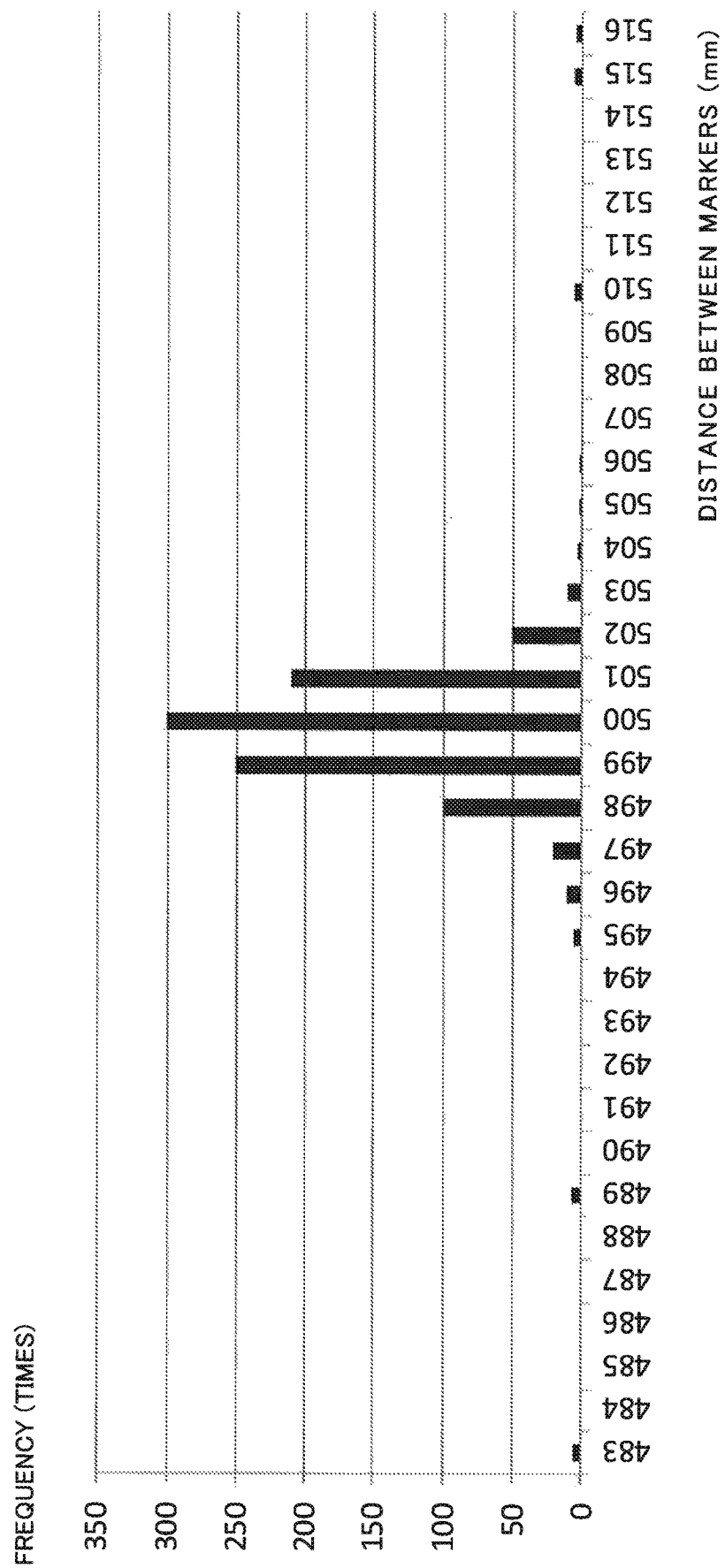
FIG. 26 shows an example histogram of pair data.

FIG. 26 shows an example histogram of certain pair data. The histogram shows, using the position of one of the markers as the reference, or as the origin, the distribution of the x element of the other marker. In this example, the true value of the x element is 500 mm, which matches the mode value. However, some values in FIG. 26 are significantly distant from the true value. Such values may have been generated because the identification information was incorrectly recognized for another pair that was actually recognized, or because a significant accidental error was caused by a disturbance or a blurred image.

To calculate an average value of the x element, the statistical processing unit 212 excludes, for example, the values distributed in the top 25% or the bottom 25%, and only uses the values in the remaining 50% close to the mode value. In this case, out of 1,000 recorded pieces of pair data, for example, the statistical processing unit 212 uses only 500 pieces to calculate an average value.

(4) Variation 4

Markers according to the present invention may be rewritable. For example, a marker according to the present invention may be a display device like what is called electronic paper, or may contain information recorded with a rewritable recording material such as a leuco dye. Additionally, a marker according to the present invention may be in a three-dimensional form relative to the imaging direction so that irregularities on the surface represent information.

(5) Variation 5

As an imaging means according to the present invention, what is called a stereo camera or a range imaging camera may be used. The range imaging camera, as mentioned here, refers to an imaging means capable of measuring a depth (distance) of the subject included in a captured image. Examples of a measuring method employed in a range imaging camera include the time of flight (TOF) method. With such an imaging means, coordinates information regarding the distance from the imaging position can be obtained more easily.

(6) Variation 6

Neither the map generation device 100 nor the picking support device 200 has any specific limitation imposed on its shape or appearance. For example, the picking support device 200 may be a wearable device configured to be worn on the user, rather than mounted on a cart. Specifically, the picking support device 200 may be in the form of a head-mounted display (HMD). Alternatively, the picking support device 200 may include a projector as a display means so that information about the article to be picked can be projected near the article. In this case, the picking support device 200 may make areas other than the article to be picked less bright.

The picking support device 200 may also include a robot arm with which an article is picked and the position of an article is informed. The picking support device 200 may further include an automatic running function to travel and perform picking operations automatically (that is, eliminate the need for user intervention).

Instead of including the light illuminating unit 250, the picking support device 200 may include a means for communicating with a signification device (a lamp or the like) that is disposed near a marker or article. In this case, the picking support device 200 communicates with the signification device corresponding to the target article to activate the signification device.

The picking support device 200 may be implemented through collaboration among a plurality of devices. For example, while some components of the picking support device 200 may be mounted on a cart, other components may be implemented by a server device or the like that is connected thereto via a network. The picking support device 200 may also include different devices configured for the first function (teaching) and the second function (picking), respectively.

(7) Variation 7

The present invention is not limited to the embodiments in the form of a device like the information processing device 100 or the picking support device 200. The present invention can be provided in the form of a method for generating map data as described above with one or more devices, or in the form of a program (or a recording medium recording the program) that can be executed by a computer.

The present invention has been described with reference to example embodiments and examples, but the present invention is not limited to these embodiments and examples. Various modifications of the present invention that could be understood by those skilled in the art may be made to configurations or details of the invention within the scope of the invention.

The present application claims priority based on Japanese Patent Application No. 2015-080163 filed on Apr. 9, 2015, the entire disclosure of which is incorporated herein.

REFERENCE SIGNS LIST

10 Picking support system
100 Information processing device
110 First acquisition unit
120 Second acquisition unit
130 Third acquisition unit
140 Identification unit
150 Informing unit
200, 200a Picking support device 210 Control unit
211 Identification unit
212 Statistical processing unit
213 Generation unit
214 Dividing unit
215 Database unit
220 Storage unit
230 Camera unit
240 UI unit
250 Light illuminating unit
260 Communication unit
300 Reader terminal

The invention claimed is:

1. An information processing device comprising:
at least one memory storing instructions; and
at least one processor configured to execute the instructions to perform:
acquiring map data representing positions of a plurality of markers disposed in a certain space;
acquiring image data representing a captured image which is taken at a first position in the space and which includes at least one of the plurality of markers;
acquiring data of an informing-target associated with a second position in the space, the second position being a target to be informed;
identifying the first position, based on the map data and on the at least one of the plurality of markers included in the captured image;
informing a user of the second position, based on a relation to the first position identified;
generating the map data; and
acquiring a plurality of pieces of image data representing a plurality of captured images, each of which includes two or more of the plurality of markers, wherein all the plurality of markers are included in at least one of the captured images,
wherein generating the map data comprises using the plurality of pieces of image data.

2. The information processing device according to claim 1, wherein the at least one processor is further configured to execute the instructions to:
acquire article information recorded in a recording medium; and
generate the map data in which the article information is associated with a position of the at least one of the markers included in the captured image that is taken at a time when the article information is read from the recording medium.

3. The information processing device according to claim 1,
wherein the at least one processor is further configured to execute the instructions to:
acquire image data that includes another marker which is different from the plurality of markers and which is presented on a terminal that is held by the user and that is used for reading article information; and
generate the map data in which a position of the other marker existing when the article information is read by the terminal is associated with the article information.

4. The information processing device according to claim 3, wherein the at least one processor is further configured to execute the instructions to:
acquire, after acquiring first data of the informing-target, second data of the informing-target in response to reading of the article information, the reading performed by the terminal; and
inform the second position based on the second data of the informing-target after informing the second position based on the first data of the informing-target.

5. An information processing system comprising:
a first device comprising the information processing device according to claim 1; and
a second device comprising:
at least one second memory storing second instructions; and
at least one second processor configured to execute the second instructions to perform:
acquiring a plurality of pieces of image data representing a plurality of captured images, each of which includes two or more of the plurality of markers, wherein all the plurality of markers are included in at least one of the captured images; and
generating the map data using the plurality of pieces of image data,
wherein the plurality of markers include markers in which identification information for identifying the plurality of markers is recorded, and
wherein the at least one processor is further configured to execute the instructions to acquire, as the data of the informing-target, either the identification information or information associated with the identification information.

6. The information processing system according to claim 5, comprising:
a plurality of image sensors that take the captured images and supply image data,
wherein the at least one hardware processor is further configured to implement the instructions to:
acquire the image data supplied by the plurality of image sensors, and
generate the map data, based on the image data supplied by the plurality of image sensors and on a positional relation between or among the plurality of image sensors.

7. A position informing method comprising:
acquiring map data representing positions of a plurality of markers disposed in a certain space;
acquiring image data representing a captured image which is taken at a first position in the space and which includes at least one of the plurality of markers;
acquiring data of an informing-target associated with a second position in the space, the second position being a informing-target;
identifying the first position, based on the map data and on the at least one of the plurality of markers included in the captured image;
informing the second position, based on a relation to the identified first position;
generating the map data; and
acquiring a plurality of pieces of image data representing a plurality of captured images, each of which includes two or more of the plurality of markers, wherein all the plurality of markers are included in at least one of the captured images
wherein generating the map data comprises using the plurality of pieces of image data.

8. A non-transitory program recording medium storing a program for causing a computer to execute the steps of:
acquiring map data representing positions of a plurality of markers disposed in a certain space;

acquiring image data representing a captured image which is taken at a first position in the space and which includes at least one of the plurality of markers;

acquiring data of the informing-target associated with a second position in the space, the second position being a informing-target to be informed;

identifying the first position, based on the map data and on the at least one of the plurality of markers included in the captured image;

informing a user of the second position, based on a relation to the identified first position;

generating the map data; and acquiring a plurality of pieces of image data representing a plurality of captured images, each of which includes two or more of the plurality of markers, wherein all the plurality of markers are included in at least one of the captured images, wherein generating the map data comprises using the plurality of pieces of image data.

* * * * *